(12) United States Patent  
Sato

(10) Patent No.: US 9,438,751 B2  
(45) Date of Patent: Sep. 6, 2016

(54) IMAGE FORMING APPARATUS

(71) Applicant: Oki Data Corporation, Tokyo (JP)

(72) Inventor: Junji Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/870,275

(22) Filed: Sep. 30, 2015

(65) Prior Publication Data

US 2016/0219156 A1    Jul. 28, 2016

(30) Foreign Application Priority Data

Jan. 27, 2015    (JP) ................................. 2015-013438

(51) Int. Cl.
*H04N 1/04* (2006.01)
*H04N 1/00* (2006.01)

(52) U.S. Cl.
CPC ........ *H04N 1/00037* (2013.01); *H04N 1/0032* (2013.01); *H04N 1/00538* (2013.01); *H04N 1/00687* (2013.01); *H04N 1/00724* (2013.01); *H04N 2201/0094* (2013.01)

(58) Field of Classification Search
CPC ..................... H04N 1/00037; H04N 1/00538; H04N 1/00687; H04N 1/00724; H04N 1/0032
USPC ................................ 358/1.13, 1.15, 1.9, 474
See application file for complete search history.

(56) References Cited

U.S. PATENT DOCUMENTS 6,922,535 B2 *    7/2005    Kim .................... G03G 15/502
                                                                399/391

FOREIGN PATENT DOCUMENTS

JP          2004-034711 A    2/2004

* cited by examiner

*Primary Examiner* — Houshang Safaipour
(74) *Attorney, Agent, or Firm* — Muncy, Geissler, Olds & Lowe, P.C.

(57) ABSTRACT

An image forming apparatus includes a case, a medium cassette that is detachably installed to the case selectively loading types of mediums, a sensor that detects first and second states of the medium cassette, the first status being determined when the medium cassette installed in the case moves in a detaching direction, and the second state being determined when the medium cassette moves in an installing direction, an output part that outputs medium setting promotion information for setting medium type information, and a control part that controls an image forming process based on a detection result by the sensor and the medium type information. When the second state is detected before a predetermined time passes from a detection of the first state by the sensor, the control part performs the image forming process by omitting an output of the medium setting promotion information, and when the second state is detected after the predetermined time has passed from the detection of the first state, the control part performs the image forming process after outputting the medium setting promotion information.

8 Claims, 16 Drawing Sheets

| First Switch | Second Switch | Third Switch | Medium Type Name |
|---|---|---|---|
| OFF | OFF | OFF | Customized Sheet |
| OFF | OFF | ON | A4 |
| OFF | ON | OFF | A5 in Vertical Dir. |
| OFF | ON | ON | A5 in Horizontal Dir. |
| ON | OFF | OFF | A6 |
| ON | OFF | ON | B5 |
| ⋮ | ⋮ | ⋮ | ⋮ |
| ON | ON | ON | Legal 14" |

IMAGE FORMING APPARATUS

CROSS REFERENCE

The present application is related to, claims priority from and incorporates by reference Japanese Patent Application No. 2015-013438, filed on Jan. 27, 2015.

TECHNICAL FIELD

The present invention relates to an image forming apparatus, suitably applied to, for example, a monochrome electrographic printer (hereinafter also referred to as a monochrome printer).

BACKGROUND

Conventionally, in an image forming apparatus, a medium cassette for loading a plurality of mediums is mounted in a manner such that it can be pulled out and pushed in, and the medium cassette is formed in a manner such that any of a plurality of types of medium having different sizes, thicknesses, materials, etc., can be loaded. Further, when the image forming apparatus detects that a medium is loaded at the time when the medium cassette is once pulled out and then pushed in for supplying the medium, etc., it displays a medium type setting menu on a display part. With this, the image forming apparatus allows an input of information relating to the type of medium on the medium type setting menu to thereby set the type of the medium, and accurately forms a print image on a surface of the medium by controlling the forming process of a print image according to the setting (for example, see Patent Document 1).

RELATED DOCUMENT(S)

[Patent Document 1] Japanese Unexamined Patent Application Publication No. 2004-34711 (page 6 to page 8, FIG. 1 to FIG. 4).

However, in a conventional image forming apparatus, for example, even in a case where a medium cassette is once pulled out and then pushed in simply to check the type of the medium, when the medium is loaded in the medium cassette, it displays the medium type setting menu on the display part. In this case, in the conventional image forming apparatus, since a predetermined operation for terminating the display is performed, or the display of the medium type setting menu is terminated by making the user wait by not allowing any operation for a fixed period of time, there was a problem in usability.

The present invention was made in view of the aforementioned points and aims to provide an image forming apparatus capable of improving the usability.

SUMMARY

An image forming apparatus includes a case, a medium cassette that is detachably installed to the case and capable of selectively loading a plurality of types of mediums, a sensor that detects at least first and second states of the medium cassette, the first status being determined when the medium cassette installed in the case moves in a detaching direction and is detached from the case, and the second state being determined when the medium cassette moves in an installing direction, which is an opposite direction from the detaching direction, and is installed in the case after the first status is detected, an output part that outputs medium setting promotion information for setting medium type information relating to the type of the medium loaded in the medium cassette, and a control part that controls an image forming process using the medium loaded in the medium cassette based on a detection result by the sensor and the medium type information. When the second state is detected by the sensor before a predetermined time passes from a detection of the first state by the sensor, the control part performs the image forming process by omitting an output of the medium setting promotion information, and when the second state is detected by the sensor after the predetermined time has passed from the detection of the first state by the sensor, the control part performs the image forming process after outputting the medium setting promotion information. Further, the invention may be embodied as a medium carrying apparatus.

Therefore, in the present invention, in a case where a medium cassette is installed to and detached from a case to check the type or the loaded amount of a medium loaded in the medium cassette, an output of a medium setting promotion information is avoided, so as to be freed of an operation to terminate the output of the medium setting promotion information or an inconvenience of waiting until the output is automatically terminated. Further, an image forming apparatus capable of improving the usability can be materialized. Further, it is achieved that an image forming apparatus with an improved usability is provided.

BRIEF DESCRIPTIONS OF THE DRAWINGS

DETAILED DESCRIPTION OF PREFERRED EMBODIMENT(S)

Hereinafter, with reference to the drawings, the best mode for carrying out the invention (hereinafter also referred to as an embodiment) will be explained. Further, the explanation will be done in the following order.
(1) Embodiment 1
(2) Embodiment 2
(3) Embodiment 3
(4) Other Embodiments (1) Embodiment 1

(1-1) Internal Configuration of Monochrome Printer

Figure 1:
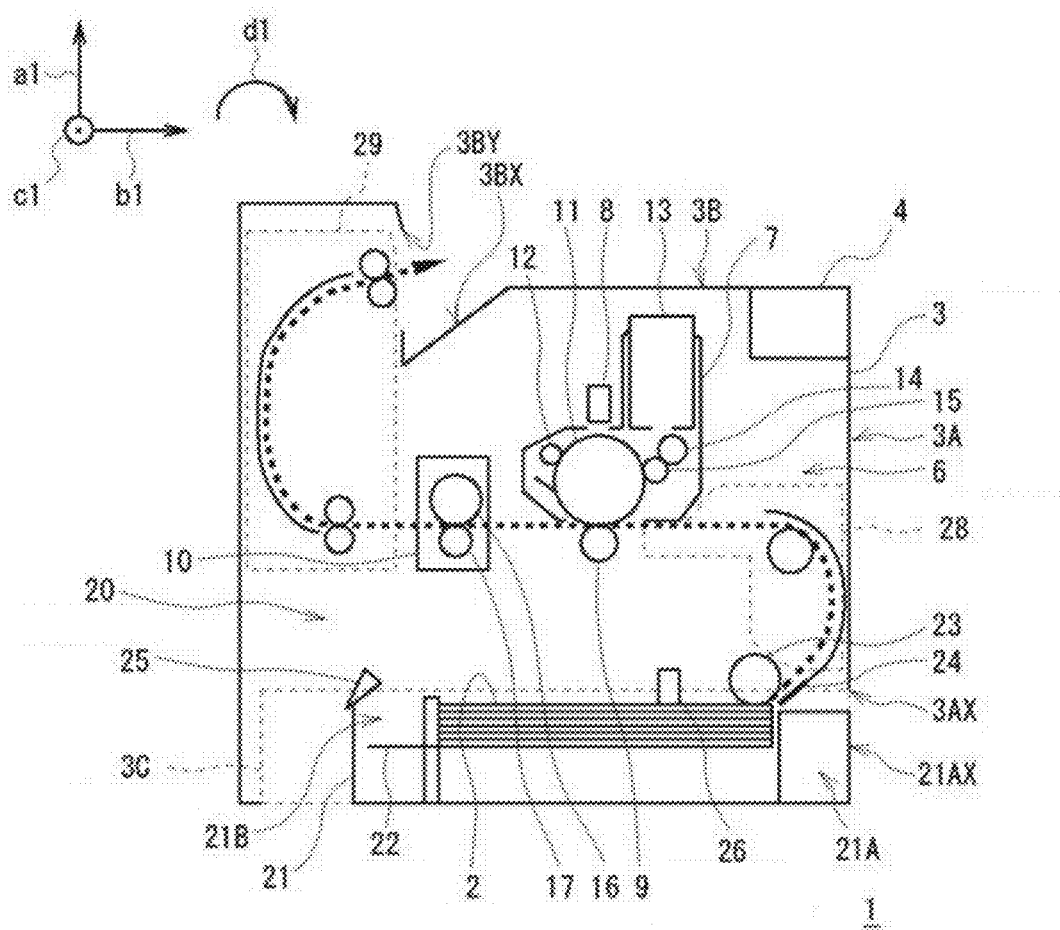
FIG. 1 is a schematic side view showing an internal configuration of a monochrome printer according to a first embodiment.

In FIG. 1, "1" denotes an entire monochrome printer according to Embodiment 1.

The monochrome printer 1 is for forming print images on a surface of a plurality of types of mediums 2 having different sizes, materials, thicknesses, etc., such as a rectangular plain paper, film, etc., and for example, is equipped with an approximately rectangular box type printer case 3 in which the right end surface of the drawing is the front face 3A. It should be noted that, in the following explanation, a direction upward from the monochrome printer 1 as shown with an arrow a1 in the drawing in a case where the monochrome printer 1 is seen facing the front face 3A of the printer case 3 is referred to as the upward direction from the printer, and the opposite direction of that may be referred to as the downward direction from the printer. In a case where it is not necessary to especially distinguish them, they may be collectively referred to as upward and downward directions of the printer. Further, in the following explanation, a direction toward the front of the monochrome printer 1 as shown with an arrow b1 in the drawing in a case where the monochrome printer 1 is seen facing the front face 3A of the printer case 3 is referred to as the front direction of the printer, and the opposite direction of that may be referred to as the rear direction from the printer. In a case where it is not necessary to especially distinguish between them, they may be collectively referred to as the front and rear directions of the printer. Furthermore, in the following explanation, a direction to the left of the monochrome printer 1 as shown with an arrow c1 in the drawing in a case where the monochrome printer 1 is seen facing the front face 3A of the printer case 3 is also referred to as the left direction of the printer, and the opposite direction of that may be referred to as the right direction from the printer. In a case where it is not necessary to especially distinguish between them, they may be collectively referred to as the left and right directions of the printer. Furthermore, in the following explanation, the direction along the long side of the medium 2 may be referred to as the medium lengthwise direction and the direction along the short side may be referred to as the medium widthwise direction. In the printer case 3, an operation panel 4 constituted by a display part such as a liquid crystal display and an operation part having a plurality of operation keys is arranged on the front end portion of the top face 3B. Further, in the printer case 3, a medium delivery part 3BX for delivering a medium 2 in which a print image is formed, and a medium ejection opening 3BY for ejecting the medium 2 to the medium delivery part 3BX from the inside of the printer case 3 are formed on the rear edge part of the top face 3B.

In the printer case 3, at the central part, an image forming part 6 for forming a print image on a surface of the medium 2 is arranged. The image forming part 6 is equipped with an image forming unit 7, a LED (Light Emitting Diode) head 8 as an exposure part, a transfer roller 9 as a transfer part, a fuser unit 10 as a fuser part, etc. The image forming unit 7 forms, on the surface of a photosensitive drum 11 as an image carrier provided rotatably in one rotational direction as shown by an arrow d1 in the drawing, an electrostatic latent image by charging to a predetermined electrical potential using a charging roller 12 as a charging part and exposing by an LED head 8, and develops an electrostatic latent image with a black toner as a developer which is supplied from a toner tank 13 as a developer containing part sequentially via a supply roller 14 as a developer supply part and a development roller 15 as a developer carrier to thereby form a toner image as a developer image. It should be noted that the one rotational direction as shown by the arrow d1 in the drawing is a rotational direction centered about an axis that is parallel to the left and right direction of the printer. Also, in the following explanation, the one rotational direction as shown by the arrow d1 in the drawing may be referred to as a first rotational direction, and the other rotational direction opposite from that may be referred to as a first counter-rotational direction, and they may by arbitrarily collectively referred as first both rotational directions. The transfer roller 9 is rotatably provided in the first counter-rotational direction in a state in which the surface is pressed against the surface of the photosensitive drum 11 at a predetermined pressure force, and transfers a toner image on the photosensitive drum 11 to the medium 2 in a state in which a voltage of a predetermined voltage value is applied. In the fuser unit 10, a heat application roller 16 having a built-in heater (not illustrated) is provided rotatably in the first rotational direction, and a pressure application roller 17 is provided rotatably in the first counter-rotational direction in a state in which the surface is pressed against the surface of the heat application roller 16 at a predetermined pressure force, and while carrying the medium 2 which is sandwiched by and between the heat application roller 16 and the pressure application roller 17, the toner image is heated and pressed to the surface of the medium 2 to be fused to thereby form a print image.

Further, in the printer case 3, a medium supply part 20 for supplying the medium 2 to the image forming part 6 is provided at the lower part on the lower side of the image forming part 6. The medium supply part 20 is equipped with a medium cassette 21 in which any type of a plurality of types of mediums 2 may be selectively loadable, and a cassette install part 3C for detachably mounting the medium cassette 21. The medium cassette 21 is formed so that the upper end is open for loading the medium 2, and is formed into an approximately flat box shape having a longer cassette depth than the cassette width. Further, in the medium cassette 21, at an end part of a cassette in the direction along the depth of the cassette (hereinafter may be referred to as the cassette depth direction), a cassette outer part 21A which is long in the direction along the cassette width (hereinafter may be referred to as the cassette width direction). Therefore, in the medium cassette 21, the concave portion toward the other end part of the cassette in the cassette depth direction is a medium load part 21B for loading a plurality of mediums 2, and a medium mounting plate 22 for mounting a plurality of mediums 2 in a state in which they are stacked in the medium load part 21B is liftably provided in a direction along the height of the cassette (hereinafter also referred to as the cassette height direction). Further, the medium cassette 21 is provided with, for example, a pair of guide rails (not illustrated) at one side part and the other side part in the cassette width direction in a direction parallel to the cassette depth direction. The cassette install part 3C is a space formed toward the bottom end of the printer case 3 and having an approximately flat rectangular shape which is long in the printer front and rear directions, and is open to the outside via, for example, an approximately rectangular shaped opening part 3AX which is long in the printer left and right directions, formed at the bottom end part of the front face 3A of the printer case 3. Also, the printer case 3 is provided with, at the opposing positions of each of the inner surface bottom end parts of the left side plate and the right side plate, a plurality of pairs of guide rollers (not illustrated) which engage with a pair of guide rails of the medium cassette 21 so as to enter the cassette install part 3C. With this, the medium cassette 21 is provided so that, in a position in which, by facing the outer part surface 21AX of the cassette outer part 21A toward the printer front direction to make the cassette depth direction parallel to the printer front and rear directions, and the cassette width direction is parallel to the printer left and right directions, from the printer case 3, it can be detached so as to be pulled out to the front side of the monochrome printer 1 from the cassette install part 3C and mounted so as to be pushed into the cassette install part 3C from the front side of the monochrome printer 1. It should be noted that, in the following explanation, the direction in which the medium cassette 21 is moved to the front side of the monochrome printer 1 so as to be detached from the cassette install part 3C (that is, the printer front direction in the case of this embodiment) can be arbitrarily referred to as the detachment direction, and the direction in which it is moved from the front side of the monochrome printer 1 to mount the medium cassette 21 to the cassette install part 3C may arbitrarily be referred to as the mount direction (that is, the printer rear direction in the case of this embodiment).

Further, in the medium supply part 20, in a state in which the medium cassette 21 is mounted in the cassette install part 3C, a feeding roller 23 and a separator 24 for feeding the medium 2 one by one from the medium cassette 21 are arranged at a predetermined position in the vicinity of right above one end part of the cassette. Furthermore, the medium supply part 20 is provided with a cassette installation/detachment sensor 25 for detecting the installation/detachment of the medium cassette 21 to and from the cassette install part 3C is provided, and also a medium lift position sensor 26 for detecting whether or not the medium 2 has been lifted to a predetermined feeding position with the medium mounting plate 22. Furthermore, in the medium supply part 20, a latch mechanism (not illustrated) is also provided for maintaining the medium cassette 21 to the cassette install part 3C in a case where the medium cassette 21 is installed in the cassette install part 3C.

In addition, in the printer case 3, at the front lower end part, a medium supply carrying part 28 for forming a medium supply carrying path for carrying the medium 2 fed out from the medium cassette 21 to the image forming part 6 is provided, and at the rear upper end part, a medium ejecting carrying part 29 for forming a medium ejecting carrying path for carrying the medium 2 fed out from the fuser unit 10 to the medium ejecting opening 3BY is provided.

(1-2) Structure of Medium Cassette

Figure 2:
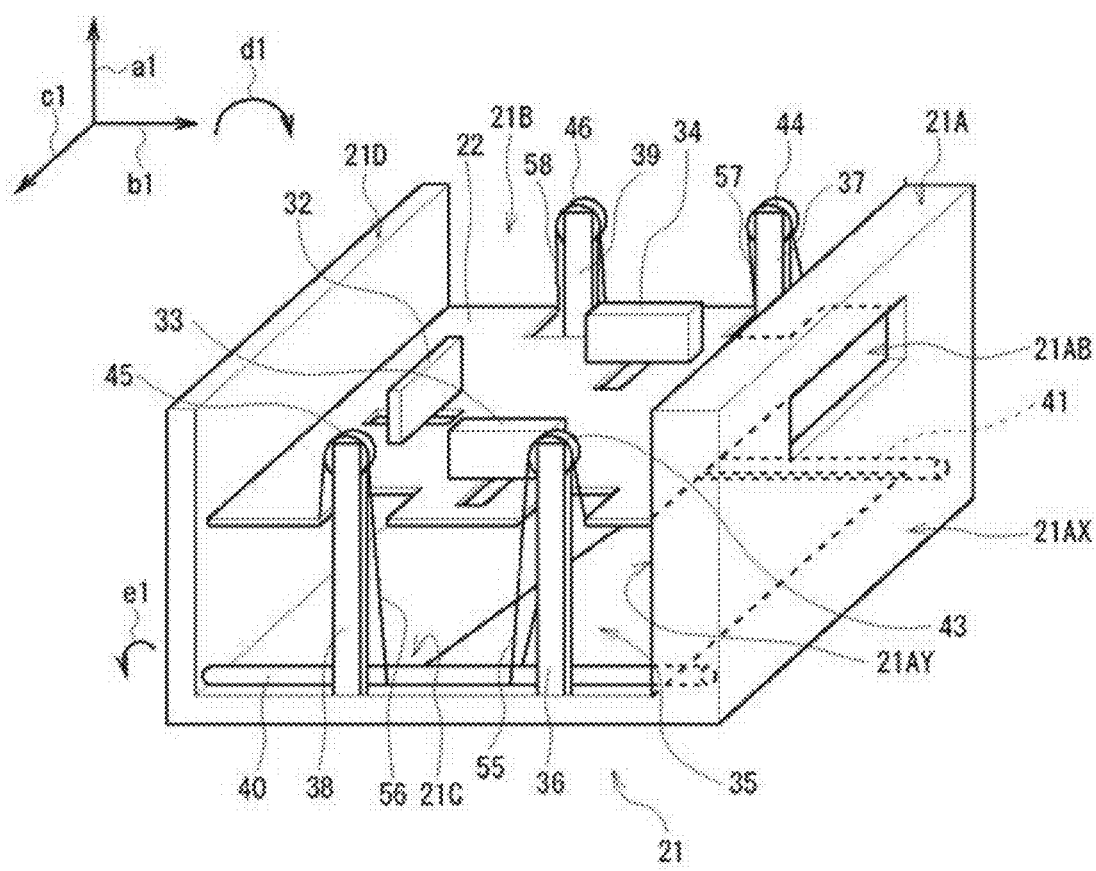
FIG. 2 is a schematic perspective view showing a configuration of a medium cassette.
Figure 3A:
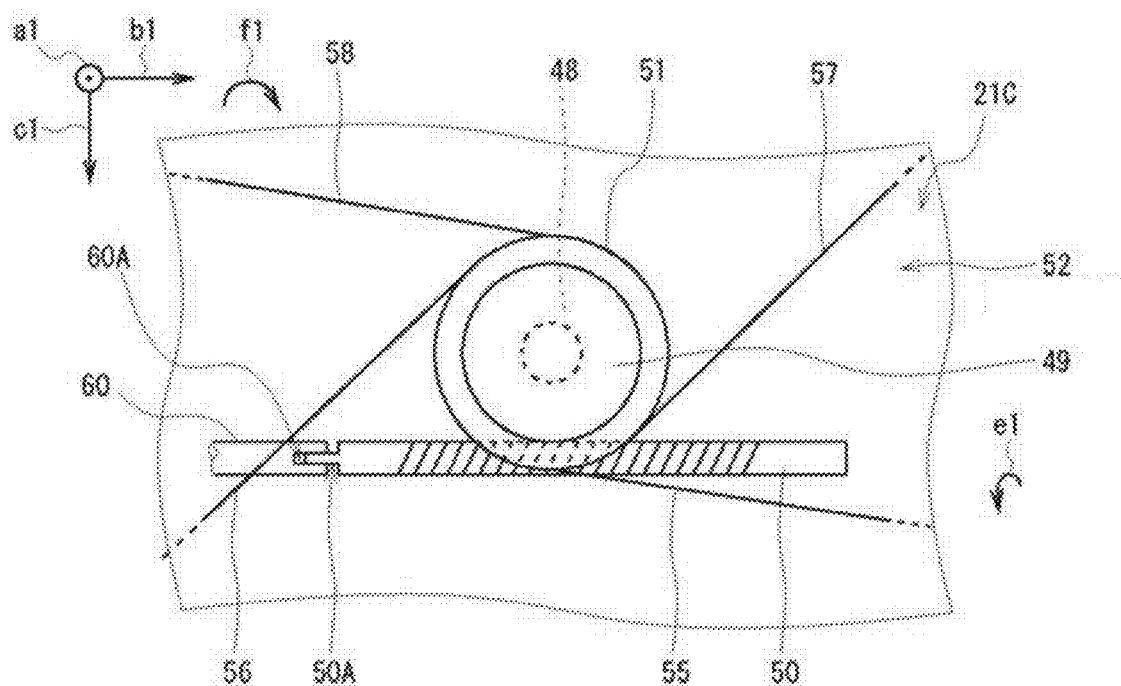
FIG. 3A is a schematic top view showing a configuration of a lift drive part of a medium cassette.
Figure 3B:
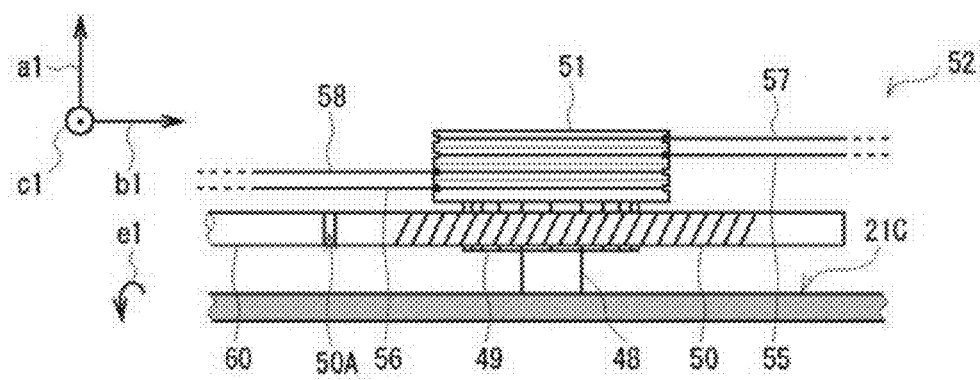
FIG. 3B is a side view showing a configuration of the lift drive part of a medium cassette.

Next, the structure of the medium cassette 21 will be explained with reference to FIG. 2 and FIG. 3. As shown in FIG. 2 and FIG. 3, in the medium cassette 21, at the central part of the outer part surface 21AX, a concave-shaped handle part 21AB for gripping with hands for the installation/detachment from the cassette install part 3C of the printer case 3 is formed. Further, in the medium mounting plate 22, for example, at the rear edge part of the top face thereof, a rear guide 32 for prescribing the depth of the medium mounting range by narrowing it to one edge side of the cassette as well as widening it to the other edge side of the cassette to match the size of the medium 2 as the outer part inner surface 21AY of the cassette outer part 21A as the standard, is provided so as to be displaceable in the cassette depth direction. Furthermore, in the medium mounting plate 22, at the left edge part and the right edge part of the top face thereof, a pair of side guides 33 and 34 for prescribing the width of the medium mounting range by narrowing it from both sides of the cassette width direction as well as widening it to both sides so as to match the size of the medium 2, are provided so as to be displaceable in conjunction with each other in the cassette width direction. Therefore, in a case where the medium cassette 21 is pulled out from the cassette install part 3C of the printer case 3, the rear guide 32 and the pair of side guides 33 and 34 can be arbitrarily displaced according to the size of the medium 2 loaded in the medium load part 21B to adjust the depth and the width of the medium mounting range so as to match the size of the medium 2. With this, the medium cassette 21 can mount a plurality of mediums 2 having the same size to the medium mounting plate 22 in a state in which they are stacked and aligned, by putting one of the short sides (or one of the long sides) in contact with the outer part inner surface 21AY and by putting the other short side (or the other long side) in contact with the rear guide 32, as well as putting one and the other long side (or one and the other short side) in contact with the pair of side guides 33 and 34. In this way, the medium cassette 21, according to the type of the medium 2, can mount a plurality of mediums 2 to the medium mounting plate 22 in a vertical state in which the medium lengthwise direction is parallel and aligned to the cassette depth direction to load to the medium load part 21B, or mount a plurality of mediums 2 to the medium mounting plate 22 in a horizontal state in which the medium lengthwise direction is parallel and aligned to the cassette widthwise direction to load to the medium load part 21B.

Further, the medium cassette 21 is provided with a mounting plate elevating part 35 for elevating the medium mounting plate 22 inside the medium load part 21B. The mounting plate elevating part 35 is equipped with a first left side column 36 and a first right side column 37, as well as a second left side column 38 and a second right side column 39, and a pair of cylinder-shaped left side cable guide part 40 and right side cable guide part 41. The first left side column 36 and the first right side column 37 are implanted at predetermined opposing positions on one end side of the cassette at the left end side and the right end side of the cassette bottom plate part 21C (that is, one end part and the other end part in the cassette widthwise direction). Further, the first left side column 36 and the first right side column 37, at the front end part, support a first left side pulley 43 and a first right side pulley 44, respectively, in a rotatable manner in the first both rotational directions via shafts that are not illustrated and parallel to the cassette widthwise direction. Furthermore, the second left side column 38 and the second right side column 39 are implanted at predetermined opposing positions on the other end side of the cassette at the left end part and the right end part of the cassette bottom plate part 21C. Also, the second left side column 38 and the second right side column 39, at the front end part, support a second left side pulley 45 and a second right side pulley 46, respectively, in a rotatable manner in the first both rotational directions via shafts that are not illustrated and parallel to the cassette widthwise direction. Further, the left side cable guide part 40, in a state in which its guide part lengthwise direction is parallel to the cassette depth direction, is supported by a bottom left corner part of the cassette outer part 21A and the bottom left corner part of the cassette rear wall part 21D in a rotatable manner in one rotational direction as shown by an arrow e1 in the drawing and the other opposite rotational direction. It should be noted that the one rotational direction as shown by the arrow e1 in the drawing is a rotational direction centered about an axis which is parallel to the cassette depth direction (or parallel to the printer front and rear direction). In the following explanation, the one rotational direction as shown by the arrow e1 in the drawing may be referred to as a second rotational direction, and the other rotational direction opposite of that may be referred to as the second counter-rotational direction, and they may arbitrarily collectively be referred to as the second both rotational directions. Furthermore, the right side cable guide part 41, in a state in which the guide part lengthwise direction is parallel to the cassette depth direction, is supported rotatably in the second both rotational directions by the bottom right corner part of the cassette outer part 21A and the bottom right corner part of the cassette rear wall part 21D.

In addition, the mounting plate elevating part 35 is also equipped with a lift drive part 52 constituted by a cylinder shaped wheel supporting shaft 48, a worm wheel 49, a worm 50, an annular cable winding part 51, etc. The wheel supporting shaft 48 is implanted to the central part of the cassette bottom plate part 21C in a manner in which it is parallel to the cassette height direction (or printer upward and downward direction). Further, the worm wheel 49 is supported at the front end part of the wheel supporting shaft 48 in a state in which it is slightly separated from the cassette bottom plate part 21C and centered about the wheel supporting shaft 48 in a manner in which it is rotatable in one rotational direction and the other opposite rotational direction as shown by an arrow f1 in the drawing.

It should be noted that the one rotational direction as shown by the arrow f1 in the drawing is a rotational direction centered about an axis parallel to the cassette height direction (that is, wheel supporting shaft 48). In the following explanation, the rotational direction as shown by the arrow f1 in the drawing may be referred to as a third rotational direction and the other rotational direction opposite of that may be referred to as a third counter-rotational direction, and they may be arbitrarily collectively referred to as a third both rotational direction. Further, in the cable winding part 51, four groove parts are formed at predetermined intervals along the circumference so as to be parallel to each other, and the cable winding part 51 is fixed integrally to the worm wheel 49 to an end face on the top side of the worm wheel 49 so as to be rotatable in the third both rotational direction centered about the wheel supporting shaft 48. Furthermore, in the lift drive part 52, at the central part of the cassette bottom plate part 21C, a pair of worm supporting parts (not illustrated) is arranged at a predetermined interval along the cassette depth direction in the vicinity of the wheel supporting shaft 48. Further, for the worm 50 is, for example, one end part of the worm and the other end part of the worm in the lengthwise direction of the worm are formed into cylinder shapes and spiral-shaped teeth are formed at the central part.

Further, for the worm 50, the worm lengthwise direction is parallel to the cassette depth direction and it is rotatable in the second both rotational direction using a pair of worm supporting parts via one end part of the worm and the other end part of the worm and supported in a slightly displaceable manner in the cassette depth direction, and the teeth at the central part are engaged to the teeth of the worm wheel 49. With this, with the worm wheel 49 and the worm 50, the lift drive part 52 forms a worm gear for rotating the worm wheel 49 in the third rotational direction according to the rotation of the worm 50 to the second rotational direction. Further, in the mounting plate elevating part 35, one end part of each of a first left side cable 55, a second left side cable 56, as well as a first right side cable 57 and a second left side cable 58 are locked to predetermined positions on the bottom of different groove parts of the cable winding part 51 without crossing each other. Further, the other end parts of the first left side cable 55 and the second left side cable 56 are pulled around to the upper side via under the left side cable guide part 40 and hooked to the first left side pulley 43 and the second left side pulley 45, then locked to a predetermined position on one end side of the cassette or the other end side of the cassette at the left end part of the medium mounting plate 22. Furthermore, the other end parts of the first right side cable 57 and the second right side cable 58 are pulled around to the upper side via under the right side cable guide part 41 and hooked to the first right side pulley 44 and the second right side pulley 46, then locked at a predetermined position on one end side of the cassette or at a predetermined position on the other end side of the cassette at the right edge part of the medium mounting plate 22.

Now, in the worm 50, for example, a worm side fitting part 50A, which is a plate-shaped protruded part, is formed at the other end part of the worm (that is, the rear end part). Furthermore, on the cassette bottom plate part 21C, a spring lock part (not illustrated) is implanted at a position facing one end of a worm of the worm 50 (that is, the front end). Further, in the lift drive part 52, one end part of a compression coil spring or a worm bias spring such as a flat spring (not illustrated) is locked to the spring lock part, and the other end part of the worm bias spring is pressed to one end of the worm with a predetermined pressure force. With this, the lift drive part 52 biases the worm 50 so as to displace to the rear side using the worm bias spring. Further, in the printer case 3, for example, a mounting plate drive motor to be explained later is arranged at the back side of the cassette install part 3C, and a driving force transmission shaft 60 connected to the motor output shaft of the mounting plate drive motor via one or a plurality of gears (not illustrated) is supported rotatably in the second both rotational direction so as to be parallel to the printer front and rear direction. Furthermore, in the driving force transmission shaft 60, at the front end part of the transmission shaft facing the printer front direction, a transmission shaft side fitting part 60A which is a slit, for example, corresponding to the worm side fitting part 50A is formed. Further, in the medium cassette 21, on the cassette rear wall part 21D, a shaft insertion hole part (not illustrated) is bored at the opposing position from the other end of the worm. Therefore, the lift drive part 52, in a case where the medium cassette 21 is installed in the cassette install part 3C of the printer case 3, introduces the driving shaft front end part of the driving force transmission shaft 60 to the medium load part 21B through the shaft insertion hole part. With this, the lift drive part 52, by pressing the other end of the worm to the driving shaft front end to engage the worm side fitting part 50A to the transmission shaft side fitting part 60A as it is, or to engage the worm side fitting part 50A to the transmission side fitting part 60A according to the rotation of the driving force transmission shaft 60 from the movement of the mounting plate driving motor, can connect the worm 50 to the motor output shaft via the driving force transmission shaft 60.

In addition, in the medium cassette 21, the lengths of each of the first left side cable 55 and the second left side cable 56, as well as the first right side cable 57 and the second right side cable 58 are arbitrarily selected. Also, in the medium cassette 21, the locking position of the other end parts of each of the first left side cable 55 and the second left side cable 56, as well as the first right side cable 57 and the second right side cable 58 to the medium mounting plate 22 are arbitrarily selected. Further, the medium mounting plate 22 is formed as to have a certain degree of weight. Furthermore, the cable winding part 51, for example, is provided with a tensile force applying spring inside, such as a torsion spring (not illustrated) which engages with the wheel supporting shaft 48 to apply a predetermined tensile force to the first left side cable 55 and the second left side cable 56, as well as the first right side cable 57 and the second right side cable 58 so they do not warp. Also, in the medium cassette 21, for example, on the outer part inner surface 21AY and the cassette rear wall part 21D, an elevation guide part (not illustrated) is formed, which is a groove part for guiding the elevation of the medium mounting plate 22 by engaging with the protruded part (not illustrated) which is protrudingly provided on the front edge and the rear edge of the medium mounting plate 22. With this, the medium cassette 21 can elevate the medium mounting plate 22 while keeping it almost horizontally in an elevation range from the lower limit position to bring into proximity with the cassette bottom plate part 21C without interfering with the lift drive part 52 to the upper limit position to bring into contact with the lower side portion of the surface of the feeding roller 23.

In fact, in the mounting plate elevating part 35, in a case where the medium cassette 21 is installed in the cassette install part 3C of the printer case 3, the mounting plate driving motor operates, thereby transmitting the rotation of the motor output shaft to the worm 50 via the driving force transmission shaft 60, and when the worm 50, for example, rotates in the second rotational direction, the worm wheel 49 and the cable winding part 51 are rotated in the third rotational direction together accordingly. With this, the mounting plate elevating part 35 can elevate the medium mounting plate 22 from the lower limit position to the upper limit position side so as to wind the first left side cable 55 and the second left side cable 56, as well as the first right side cable 57 and the second right side cable 58 to the cable winding part 51. Further, in the mounting plate elevating part 35, when the medium cassette 21 is detached from the cassette install part 3C of the printer case 3, the worm side fitting part 50A detaches from the transmission shaft side fitting part 60A, releasing the link of the motor output shaft and the worm 50. Therefore, in the mounting plate elevating part 35, the rotation restraining force which restrained the rotation in the second counter-rotational direction which had an effect on the worm wheel 49 as well as the cable winding part 51 from the motor output shaft of the mounting plate driving motor sequentially via the transmission side fitting part 60A and the worm side fitting part 50A up to that point stops being effective. Further, in the mounting plate elevating part 35, due to the self-weight of the medium mounting plate 22, the other end parts of the first left side cable 55 and the second left side cable 56, as well as the first right side cable 57 and the second right side cable 58 are pulled downward. Therefore, the mounting plate elevating part 35 draws out the first left side cable 55 and the second left side cable 56 as well as the first right side cable 57 and the second right side cable 58 from the cable winding part 51 while rotating the cable winding part 51 to the third counter-rotational direction. With this, the mounting plate elevating part 35 can lower the medium mounting plate 22 from the upper limit position side to the lower limit position. Further, at this time, the mounting plate elevating part 35 gradually lowers the medium mounting plate 22 while applying a tensile force on the first left side cable 55 and the second left side cable 56 as well as the first right side cable 57 and the second right side cable 58 using the tensile force applying spring to prevent the medium mounting plate 22 from descending rapidly to the lower limit position, which adds shock and damages it.

(1-3) Structure of Circuit of Monochrome Printer

Figure 4:
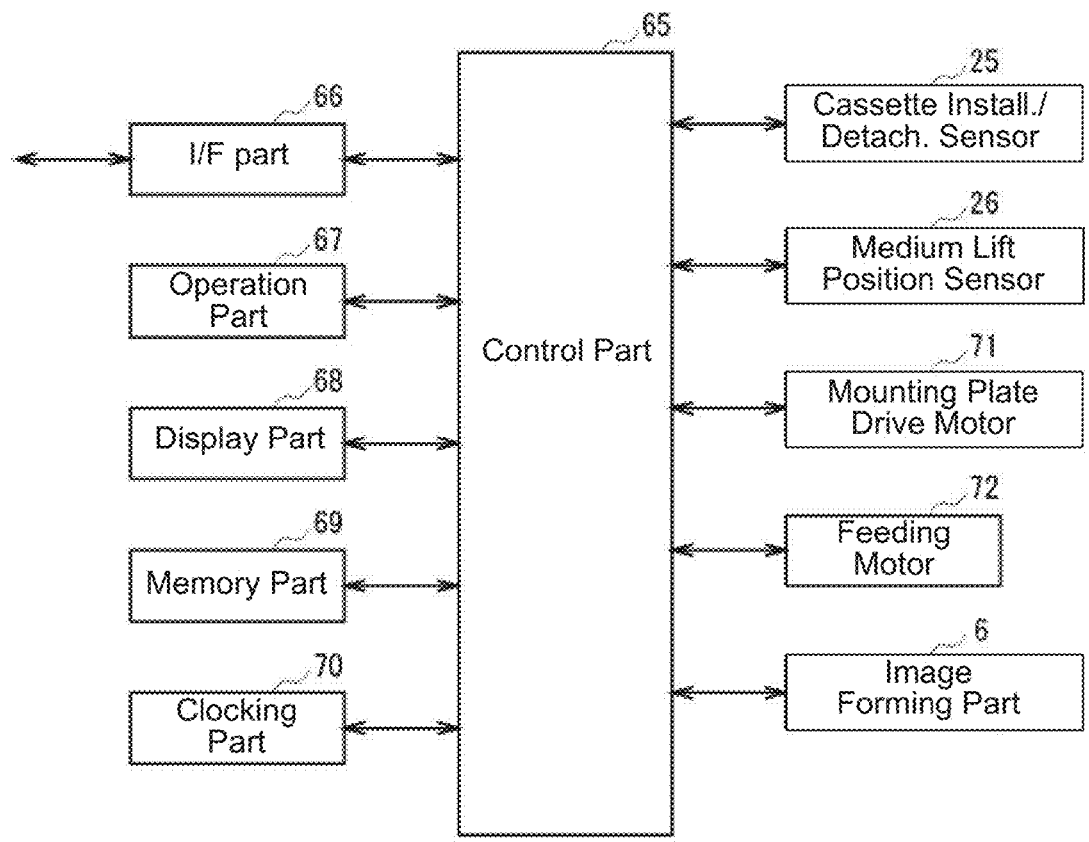
FIG. 4 is a block diagram showing a circuit configuration of a monochrome printer.

Next, the structure of the circuit of the monochrome printer 1 will be explained with reference to FIG. 4. The monochrome printer 1, for example, is equipped with a control part 65 having a microprocessor configuration, and to the control part 65, a host device such as an external computer (not illustrated) is connected via an interface part 66, and the operation part 67 and the display part 68 of the abovementioned operation panel 4 are also connected. Further, in the control part 65, various programs such as a basic program, the first setting screen display control processing program, etc., are stored in advance, and also, a memory part 69 such as a hard disc drive or a semiconductor memory, in which various information for forming print images, etc., are stored, is connected, as well as, for example, a clocking part 70 having a plurality of first timer and second timer for clocking a first predetermined time (hereinafter may be referred to as a first setting time) and a second predetermined time (hereinafter may be referred to as a second setting time) that are set in advance and different from each other, is connected. Furthermore, to the control part 65, the aforementioned cassette installation/detachment sensor 25, a medium lift position sensor 26 and a mounting plate drive motor 71 are connected, and also, a feeding motor 72 for driving the feeding roller 23 and an image forming part 6 are connected. Further, the control part 65 controls the monochrome printer 1 as a whole according to the various programs red out from the memory part 69, and executes predetermined computation processes and various processes according to the control commands provided from the host device and the operation commands inputted via the operation part 67.

With this, when the control part 65 detects from the cassette installation/detachment sensor 25 that the medium cassette 21 has been pulled out and detached from the cassette install part 3C of the printer case 3, it accordingly retrieves a medium setting screen data that is stored in advance from the memory part 69 and displays a medium setting screen (not illustrated) on the display part 68.

Further, the medium setting screen is for guiding the input of medium setting information for setting the type of a medium 2 to be loaded in the medium cassette 21 for forming a print image (that is, the size, the material, the thickness, etc.), the loading orientation of the medium 2 to the medium cassette 21 (that is, the mounting orientation of the medium 2 to the medium mounting plate 22 such as vertical or horizontal), etc. Therefore, when the medium setting information relating to the medium 2 is inputted via the operation part 67 according to the guidance of the medium setting screen, the control part 65 transmits and the information to the memory part 69 and stores it as the medium setting data. Further, when the control part 65 detects from the cassette installation/detachment sensor 25 that the medium cassette 21 (that is, a medium cassette 21 in which one or a plurality of mediums 2 are loaded) has been installed to the cassette install part 3C of the printer case 3, it operates the mounting plate drive motor 71 to elevate the medium mounting plate 22 in the medium cassette 21 via the mounting plate elevating part 35. Then, when the control part 65 detects from the medium elevation position sensor 26 that the medium 2 at the uppermost position among a plurality of mediums 2 mounted in a stacked state to the medium mounting plate 22 (hereinafter may be especially referred to as the uppermost medium) has reached the upper limit position of the elevation range, the control part 65 stops the operations of the mounting plate drive motor 71 once. With this, the control part 65 presses the uppermost medium 2 to the feeding roller 23.

In this state, when the control part 65 fetches the print data transmitted from the host device and the control command instructing to form a print image via the interface part 66, it executes the image forming process. At this time, the control part 65 retrieves the medium setting data from the memory part 69 and controls the drive of the image forming part 6 based on the medium setting data to start up the image forming part 6 into a state in which a print image can be formed according to the type, loading orientation, etc., of the medium 2 loaded in the medium cassette 21. Further, although it is not illustrated, the control part 65 controls the drive of the medium supply carrying part 28 and the medium ejection carrying part 29 based on the medium setting data to start up the medium supply carrying part 28 and the medium ejection carrying part 29 so that the medium 2 loaded in the medium cassette 21 can be carried at a carrying speed according to the type, the loading orientation, etc. The control part 65 operates the feeding motor 72 to rotate the feeding roller 23 to feed one sheet of medium 2 (that is, the uppermost medium 2) from the medium cassette 21 using the feeding roller 23 and carries it to the image forming part 6 via the medium supplying carrying path. Furthermore, the control part 65 starts the control of the drive of the image forming part 6 (that is, the LED head 8) based on the print data at a predetermined timing during the carriage of the medium 2 to the image forming part 6 to start forming a toner image on the surface of the photosensitive drum 11 in the image forming unit 7 as described above.

Therefore, the control part 65 transfers the toner image on the photosensitive drum 11 to the surface of the medium 2 while continuing to carry the medium 2 carried to the image forming part 6 using the photosensitive drum 11 and the transfer roller 9. Next, the control part 65 applies heat and pressure to the medium 2 using the fuser unit 10 while carrying the medium 2 to form a monochromatic print image so as to fuse the toner image to the surface of the medium 2. Then, the control part 65 carries the medium 2 in which a print image was formed and fed from the fuser unit 10 to the medium ejection opening 3BY via the medium ejection carrying path to eject it to the medium delivery part 3BX. In this way, the control part 65 is able to form a monochromatic print image on the surface of the medium 2 loaded in the medium cassette 21. Further, in a case where a print image is successively formed on a plurality of mediums 2, the control part 65 intermittently operates the mounting plate drive motor 71 every time one sheet off medium 2 (that is, the uppermost medium 2) is fed from the medium cassette 21. With this, the control part 65 slightly elevates the medium mounting plate 22 in the medium cassette 21 via the mounting plate elevating part 35 and presses the new uppermost medium 2 to the feeding roller 23. In this way, the control part 65 can feed a plurality of mediums 2 from the medium cassette 21 one by one using the feeding roller 23 under the same condition at all times and carry them to the image forming part 6 to form a monochromatic print image to the surface of the medium 2. Herein, when the medium is positioned at the top of the medium cassette and is ready to be carried to the medium path, the medium is defined as being in a print-ready state. The top of the medium cassette means either the uppermost medium of the piled media or the final medium loaded in the medium cassette. Also, the medium is carried to the image forming unit 5 along the carrying path. The medium, which is after ejected from the medium cassette before reaching the image forming unit, as well may be defined in the print-ready state. In other words, the most upstream spot of the print-ready state is at the uppermost spot of the loaded media and the most downstream spot is in front of (in the vicinity of) the image forming unit.

In the monochrome printer 1, the medium cassette 21 is pulled out from the cassette install part 3C of the printer case 3 and mediums 2 are loaded in the medium cassette 21. For this reason, as described above, when the control part 65 detects from the cassette installation/detachment sensor 25 that the medium cassette 21 has detached from the cassette install part 3C, it accordingly displays a medium setting screen on the display part 68. However, in the monochrome printer 1, there is a case where the medium cassette 21 is pulled out from the cassette install part 3C to check for the presence or absence of loaded medium 2 in the medium cassette 21 or the loaded amount (that is, the approximate number of pages), the type, etc., of the loaded medium 2. Also, in the monochrome printer 1, in a case where only the type, the loaded amount, the loaded orientation, etc., of the medium 2 loaded in the medium cassette 21 is checked without specifically replenishing the medium 2 and changing the medium 2 to be loaded with another type, the medium cassette 21 is installed again to the cassette install part 3C in a remarkably short time from the time of the detachment compared to a case in which one or a plurality of mediums 2 are loaded to the medium cassette 21. Therefore, when the control part 65 detects from the cassette installation/detachment sensor 25 that the medium cassette 21 is detached from the cassette install part 3C, it resets the first timer of the clocking part 70 once at that time and starts clocking to a predetermined first setting time which is remarkably short, such as, for example, 5 to 10 seconds, which is chosen in advance. It should be noted that the first setting time, for example, is chosen to be a predetermined time that is slightly longer than the average value, based on an average value of the time needed from the time of the detachment in which the medium cassette 21 is pulled out from the cassette install part 3C to the installed time in which the medium cassette 21 is pushed into the cassette install part 3C again only after checking the type, the loaded amount, the loaded orientation, etc., of the medium 2 loaded in the medium cassette 21. Therefore, when the control part 65 detects from the cassette installation/detachment sensor 25 that the medium cassette 21 is installed into the cassette install part 3C before the time clocked by the first timer (hereinafter may be referred to as the first timer clocking time) reaches the first setting time, since the medium cassette 21 was installed again to the cassette install part 3C only after checking the medium 2 loaded in the medium cassette 21, it does not display the medium setting screen on the display part 68 as there is no need to change the setting of the medium 2.

On the other hand, in a case where it has detected from the cassette installation/detachment sensor 25 that the medium cassette 21 is still detached from the cassette install part 3C after the first timer clocking time as reached the first setting time (that is, the medium cassette 21 is not installed in the cassette install part 3C), since there is a possibility that mediums 2 were replenished in the medium cassette 21 or that mediums 2 were loaded again (that is, a different type of medium 2 from before the detachment was loaded or the same type of medium 2 as before the detachment was loaded in a different loading orientation), the control part 65 displays the medium setting screen on the display part 69. With this, the control part 65 can allow a user to input the medium setting information relating the medium 2 via the operation part 67 according to the guidance of the medium setting screen, and on top of that, when the termination of the display is instructed via the operation part 67, it terminates the display on the medium setting screen to the display part 68 accordingly. It should be noted that the control part 65, for example, when the first timer clocking time reaches the first setting time before the medium cassette 21 is installed in the cassette install part 3C because medium 2 was replenished in the medium cassette 21, in this case, it also displays the medium setting screen to the display part 68. However, at this point, when the termination of the display is instructed via the operation part 67 according to the guidance of the medium setting screen, the control part 65 can terminate the display of the medium setting screen for the display part 68 accordingly.

Further, when the control part 65 detects from the cassette installation/detachment sensor 25 that, after displaying the medium setting screen on the display part 68, the medium cassette 21 is installed in the cassette install part 3C without the operation part 67 being operated at all, it resets the second timer of the clocking part 70 once at that point and starts clocking until, for example, a predetermined second setting time such as 30 seconds, which is chosen in advance to be longer than the first setting time. Then, in a case where a medium setting information relating to the medium 2 is input by a user via the operation part 67 according to the guidance of the medium setting screen before the time clocked by the second timer (hereinafter may be referred to as the second timer clocking time) reaches the second setting time, and on top of that, the termination of the display is instructed via the operation part 67, the control part 65, terminates the display of the medium setting screen for the display part 68 accordingly. On the other hand, in a case where the second timer clocking time reaches the second setting time without the operation part 67 being operated at all, the control part 65 automatically terminates the display of the medium setting screen for the display part 68 at that point. That is, in a case where there is no need to especially change the medium setting information of the medium 2 loaded in the medium cassette 21 before or after the installation/detachment of the medium cassette 21, when the second timer clocking time reaches the second setting time, the control part 65 can automatically terminate the display of the medium setting screen for the display part 68 accordingly even without instructing the termination of the display via the operation part 67. In this way, the control part 65 can arbitrarily set the type of the medium 2 used for forming a print image, the loading orientation to the medium cassette 21, etc., by inputting the medium setting information according to the installation/detachment of the medium cassette 21 to the cassette install part 3C. In addition, for the control part 65, the medium setting screen can be displayed on the display part 68 to input the medium setting information not only at the time of such installation/detachment of the medium cassette 21 to the cassette install part 3C, but when the display of the medium setting screen is requested by a user via the operation part 67. Therefore, even in a case where, for example, the type of the medium 2 used for forming a print image, the loading orientation to the medium cassette 21, etc., are erroneously set, the control part 65 can correct the setting by allowing to re-input the medium setting information at an arbitrary timing.

(1-4) First Setting Screen Display Control Process Procedure

Figure 5:
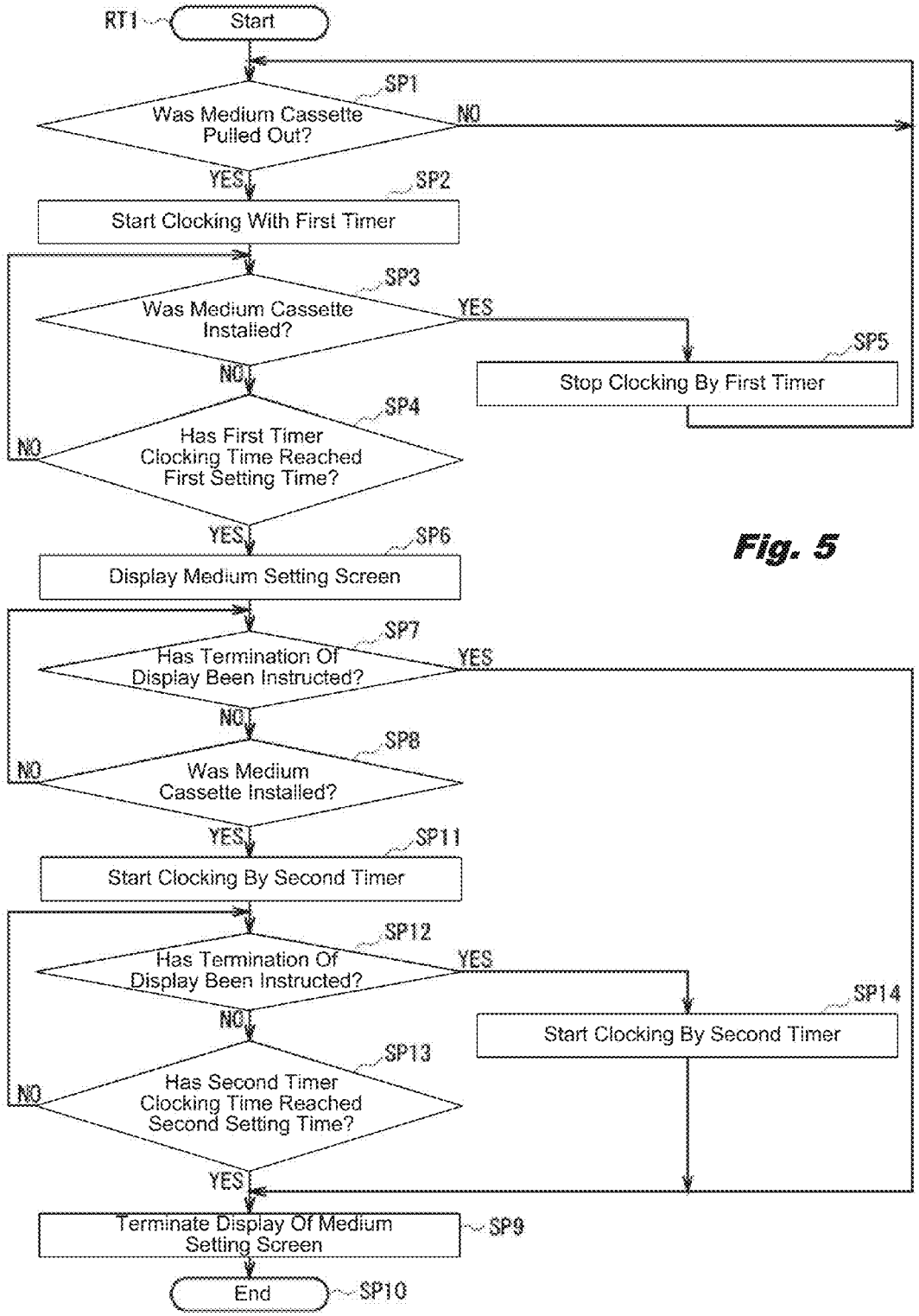
FIG. 5 is a flowchart showing a first setting screen display control process procedure.

Next, the first setting screen display control process procedure RT1 executed by the control part 65 will be explained with reference to the flow chart as shown in FIG. 5.

The control part 65, for example, after starting the monochrome printer 1 according to the start-up operation of the operation part 67, starts the first setting screen display control process procedure RT1 as shown in FIG. 5 according to the first setting screen display control process program retrieved from the memory part 69.

The control part 65, after starting the first setting screen display control process procedure RT1, by discerning whether or not the medium cassette 21 is pulled out and detached from the cassette install part 3C of the printer case 3 in Step SP1, and waits for the medium cassette 21 to be pulled out from the cassette install part 3C.

Then, in Step SP1, when the control part 65 detects from the cassette installation/detachment sensor 25 that the medium cassette 21 is pulled out and detached from the cassette install part 3C and obtains an affirmative result, it shifts to the next step SP2. In Step SP2, the control part 65 resets the first timer once and then starts clocking with the first timer, and shifts to the next Step SP3. In Step SP3, the control part 65 discerns whether or not the medium cassette 21 is installed in the cassette install part 3C of the printer case 3, and when it detects with the cassette installation/detachment sensor 25 that the medium cassette 21 is still detached from the cassette install part 3C and obtains a negative result, it shifts to the next Step SP4. In Step SP4, the control part 65 discerns whether or not the first timer clocking time has reached the first setting time, and when the first timer clocking time has not reached the first setting time and it obtains a negative result since, it returns to Step SP3. In this way, after this, the control part 65 cyclically and repeatedly executes the processes of Step SP3 and Step SP4 until it obtains an affirmative result from either Step SP3 or Step SP4, and waits for the medium cassette 21 to be installed in the cassette install part 3C or the first timer clocking time to reach the first setting time.

Further, in Step SP3, when the control part 65 detects from the cassette installation/detachment sensor 25 that the medium cassette 21 is installed to the cassette install part 3C before the first timer clocking time reaches the first setting time and obtains an affirmative result, it shifts to the next step SP5. With this, in Step SP5, the control part 65 stops the clocking by the first timer and returns to Step SP1. In this way, in a case where the medium cassette 21 is pulled out and detached from the cassette install part 3C and installed again in a comparatively short time from the time of detachment, the control part 65 determines that there is no need to change the setting of the medium 2 since the type or the loading orientation of the medium 2 loaded in the medium cassette 21 has not been changed at all, and does not display the medium setting screen on the display part 68. On the other hand, in Step SP4, in a case where the first timer clocking time reaches the first setting time while the medium cassette 21 is not installed in the cassette install part 3C and an affirmative result is obtained, the control part 65 shifts to Step SP6. In Step SP6, after retrieving the medium setting screen data from the memory part 69 and displaying the medium setting screen on the display part 68, the control part 65 shifts to the next Step SP7. In this way, in a case where the medium cassette 21 is not installed to the cassette install part 3C after the first setting time has passed from the time of the detachment, the control part 65 determines that there is a comparatively high possibility that the type or the loading orientation of the medium 2 loaded in the medium cassette 21 has been changed and thus, that there is a possibility that the setting of the medium 2 will be changed, and thereby displays the medium setting screen on the display part 68.

In Step SP7, the control part 65 discerns whether or not the termination of the display of the medium setting screen on the display part 68 has been instructed, and when a negative result is obtained since the termination of the display of the medium setting screen is not instructed via the operation part 67, it shifts to the next Step SP8. In Step SP8, the control part 65 discerns whether or not the medium cassette 21 is installed in the cassette install part 3C of the printer case 3, and when it detects with the cassette installation/detachment sensor 25 that the medium cassette 21 is still detached from the cassette install part 3C and obtains a negative result, it returns to Step SP7. With this, after that, the control part 65 cyclically and repeatedly executes the processes of Step SP7 and Step SP8 until it obtains an affirmative result from either Step SP7 or Step SP8, and waits for the instruction for the termination of the display of the medium setting screen or the medium cassette 21 to be installed in the cassette install part 3C.

Then, in Step SP7, before the medium cassette 21 is installed in the cassette install part 3C, when a medium setting information is arbitrarily inputted by a user via the operation part 67 according to the content of the medium setting screen and an affirmative result is obtained since the termination of the display of the medium setting screen is instructed, the control part 65 shifts to Step SP9. Therefore, in Step SP9, after terminating the display of the medium setting screen on the display part 68 (that is, after deleting the display of the medium setting screen), the control part 65 shifts to the next Step SP10 and terminates the first setting screen display control process procedure RT1. In this way, for example, when the medium setting screen is displayed on the display part 68 in a case where the installation of the medium cassette 21 to the cassette install part 3C is taking long due to the replenishment of medium 2 even when the type of the medium 2 loaded in the medium cassette 21 and the loading orientation have not been changed at all, the control part 65 can instruct the termination of the display of the medium setting screen without specifically inputting the medium setting information via the operation part 67 to terminate the display even before installing the medium cassette 21 to the cassette install part 3C. In this way, for example, when the medium setting screen is displayed on the display part 68 while the type or the loading orientation of the medium 2 loaded in the medium cassette 21 is being changed, the control part 65 can input the new medium setting information via the operation part 67 according to the type of the medium 2 loaded in the medium cassette 21 and the loading orientation at that point, and can instruct the termination of the display of the medium setting screen can even before installing the medium cassette 21 to the cassette install part 3C to terminate the display. On the other hand, in Step SP8, when the control part 65 detects with the cassette installation/detachment sensor 25 that the medium cassette 21 is installed to the cassette install part 3C before the termination of the display of the medium setting screen is instructed and obtains an affirmative result, it shifts to Step SP11. In this way, in the control part 65, for example, in a state in which the medium setting screen is displayed on the display part 68, when a medium 2 of a different type from before the detachment is loaded or a medium cassette 21 in which the mediums 2 are loaded in a different loading orientation is installed in the cassette install part 3C, a user can input new medium setting information via the operation part 67 according to the type of the medium 2 loaded in the medium cassette 21 and the loading orientation. Further, in a case where the medium setting screen is displayed on the display part 68 but the loaded amount, the type, and the loading orientation of the medium 2 that is already loaded is confirmed and the installation of the medium cassette 21 to the cassette install part 3C is taking long due to the replenishment of the medium 2, the control part 65 can instruct the termination of the display of the medium setting screen without specifically inputting the medium setting information via the operation part 67.

However, in Step SP11, the control part 65 resets the second timer once, starts the clocking by the second timer, and shifts to the next Step SP12. In Step SP12, the control part 65 discerns whether or not the termination of the display of the medium setting screen on the display part 68 has been instructed, and when a negative result is obtained since the termination of the display of the medium setting screen is not instructed via the operation part 67, it shifts to the next Step SP13. In Step SP13, the control part 65 discerns whether or not the second timer clocking time has reached the second setting time, and when a negative result is obtained since the second timer clocking time has not reached the second setting time, it returns to Step SP12. With this, after that, the control part 65 cyclically and repeatedly executes the processes of Step SP12 and Step SP13 until it obtains an affirmative result from either Step SP12 or Step SP13, and waits for the termination of the display of the medium setting screen to be instructed or the or the second timer clocking time to reach the second setting time. Then, in step SP12, when an affirmative result is obtained since a medium setting information is arbitrarily inputted by a user via the operation part 67 according to the content of the medium setting screen before the second timer clocking time reaches the second setting time and the termination of the display of the medium setting screen is instructed, the control part 65 shifts to Step SP14. Therefore, in Step SP14, after stopping the clocking by the second timer and shifting to Step SP9 to terminate the display of the medium setting screen on the display part 68, the control part 65 shifts to the next Step SP10 and terminates the first setting screen display control process procedure RT1. On the other hand, in Step SP13, when the second timer clocking time reaches the second setting time and an affirmative result is obtained before the termination of the display of the medium setting screen is instructed, the control part 65 shifts to Step SP9. Then, in Step SP9, after automatically terminating the display of the medium setting screen on the display part 68 without specifically having a user instruct the termination of the display of the medium setting screen via the operation part 67, the control part 65 shifts to the next Step SP10 and terminates the first setting screen display control process procedure RT1.

It should be noted that the control part 65, for example, starts the first setting screen display control process procedure RT1 according to the start-up of the monochrome printer 1, but during the operation of the monochrome printer 1 (that is, during energization), after the first setting screen display control process procedure RT1 is finished, the first setting screen display control process procedure RT1 is started again. In this way, during the operation of the monochrome printer 1, the control part 65 repeatedly executes the first setting screen display control process procedure RT1, and every time the medium cassette 21 is pulled out from the cassette install part 3C, it displays the medium setting screen on the display part 68 and allows the medium setting information to be inputted.

(1-5) Operation and Effect of Embodiment 1

In the following configuration, when the control part 65 of the monochrome printer 1 detects with the cassette installation/detachment sensor 25 that the medium cassette 21 is pulled out from the cassette install part 3C and detached from the cassette install part 3C of the printer case 3, it starts clocking with the first timer. Then, when the control part 65 of the monochrome printer 1 detects with the cassette installation/detachment sensor 25 that the medium cassette 21 is installed in the cassette install part 3C before the first timer clocking time reaches the comparatively short first setting time, it does not display the medium setting screen on the display part 68 in this case. According to the aforementioned structure, the monochrome printer 1, in a case where the medium cassette 21 is pulled out by the user once from the cassette install part 3C of the printer case 3 to check the type, the loading amount, the loading orientation, etc., of the medium 2 loaded in the medium cassette 21 and installed again so as to be pushed in, the display of the medium setting screen on the display part 68 can be avoided, and as a result, the user can be freed from the troublesomeness of operating the operation part 67 to terminate the display of the medium setting screen or to wait until the display is automatically terminated. With this, the usability of the monochrome printer 1 can be improved.

Further, in the control part 65 of the monochrome printer 1, in a case where the first timer clocking time reaches the first setting time before the medium cassette 21 is installed in the cassette install part 3C of the printer case 3, the medium setting screen is displayed on the display part 68. With this, in a case where the medium cassette 21 is pulled out from the cassette install part 3C of the printer case 3 and the type or the loading orientation of the medium 2 to be loaded is changed, the monochrome printer 1 can automatically display the medium setting screen to guide the input of the medium setting information without having the user perform an operation to display the medium setting screen on the display part 68, thereby further improving the usability.

(2) Second Embodiment (2-1) Structure of Monochrome Printer

Figure 6:
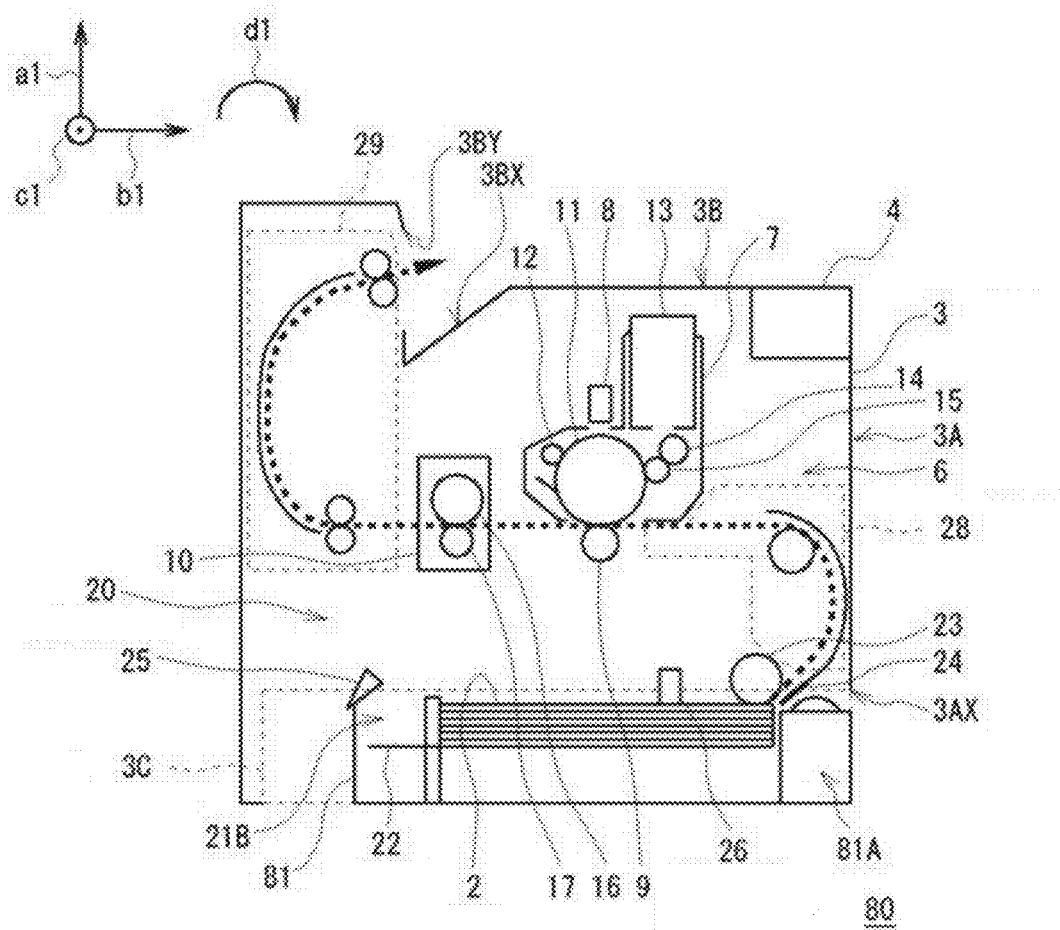
FIG. 6 is a schematic side view showing an internal configuration of a monochrome printer according to a second embodiment.

Next, the structure of the monochrome printer 80 according to the second embodiment will be explained with reference to FIG. 6 using the same symbols for the parts corresponding to FIG. 1. The monochrome printer 80, excluding a part of the structure of the medium cassette 81 and a part of the processes executed by a later explained control part, has the same structure as the monochrome printer 1 according to the aforementioned first embodiment. The medium cassette 81, excluding that a later explained selection operator for selecting the type and the loading orientation of the medium 2 loaded in the medium loading part 21B and a later explained selection type operator for detecting the type and the loading orientation of the selected medium 2 via the selection operator are provided at the cassette outer part 81A, has the same structure as the medium cassette 21 according to the aforementioned first embodiment.

(2-2) Structure of the Medium Cassette

Figure 7:
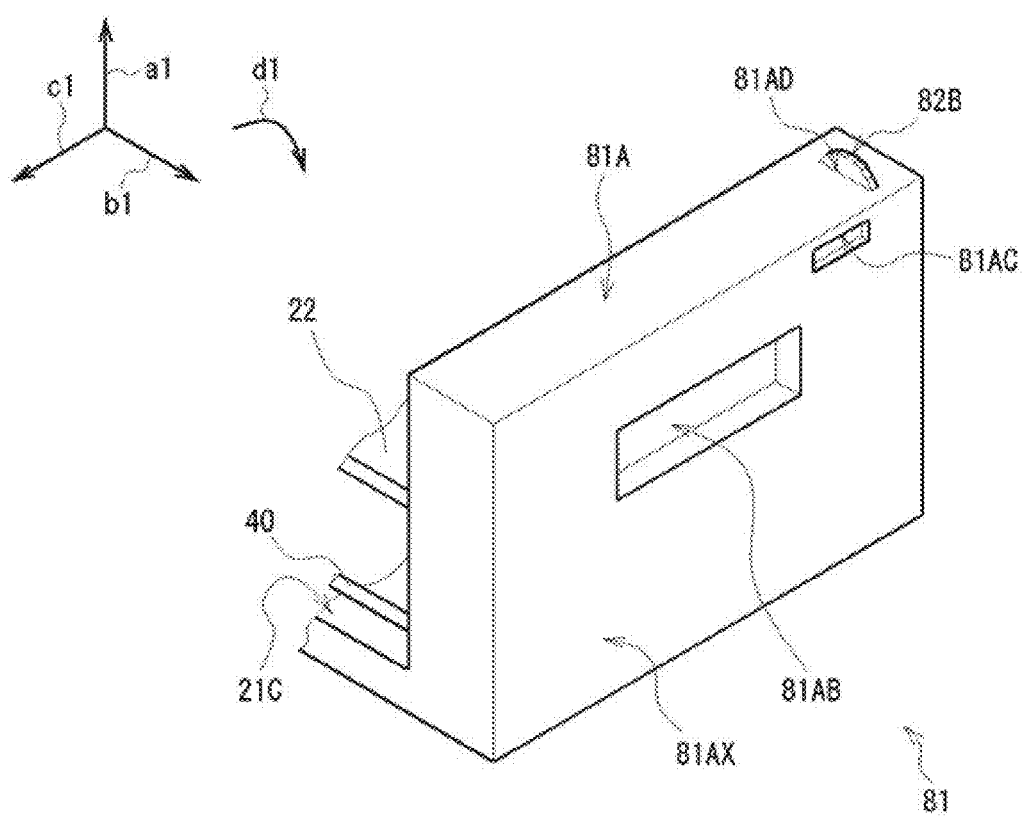
FIG. 7 is a schematic perspective view showing a configuration of a medium cassette.
Figures 8, 9:
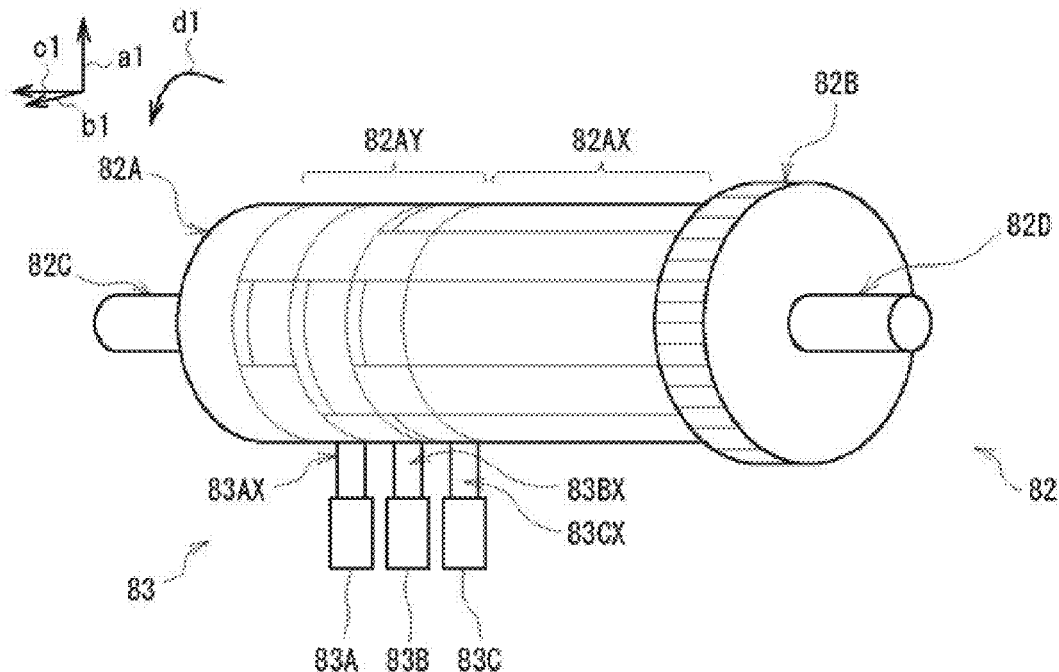
FIG. 8 is a schematic perspective view showing a configuration of a selection operator and a selection type operator.
FIG. 9 is a schematic diagram showing a correspondence relationship between a medium type name and an output of a selection type operator.

As shown in FIG. 7 in which the same symbols are used for parts corresponding to FIG. 2, in the medium cassette 81, at the central part of the outer part surface 81AX of the cassette outer part 81A, a handle part 81AB is formed in a similar manner as the medium cassette 21 according to Embodiment 1. Further, in the medium cassette 81, a name exposing hole part 81AC having a long rectangular shape in the cassette widthwise direction (that is, left and right direction of the printer) is bored at a predetermined position at the upper right end part of the outer part surface 21AX in the cassette outer part 81A. Further, in the medium cassette 81, a dial exposed hole part 81AD having a long rectangular shape in the cassette depth direction (that is, front and rear direction of the printer) is bored at a predetermined position in the right end part on the top face of the outer part in the cassette outer part 81A. In addition, as shown in FIG. 7 and FIG. 8, in the medium cassette 81, the selection operator 82 and the selection type operator 83 are stored at the upper right end part in the cassette outer part 81A. The selection operator 82 is equipped with an approximately cylindrical operator main body 82A, and one end part of the operator main body 82A is a medium type selecting part 82AX for selecting the type and the loading orientation of the medium 2 loaded in the medium loading part 21B. The surface of the medium type selecting part 82AX is divided into a plurality of type name display regions having approximately rectangular shapes that are long in the lengthwise direction of the operator along the circumference. Further, in the individual type name display regions in the medium type selecting part 82AX, for example, character strings expressing the name, the size, the loading orientation, etc., of the medium 2, are displayed as the medium type names showing the type and the loading orientation of the selectable medium 2.

Further, the other end part of the operator main body 82A is a selected medium notification part 82AY for notifying the selected type and the loading orientation of the medium 2 via the medium type selecting part 82AX. In the selected medium notification part 82AY, at the type notification part next to every type name display region of the medium type selecting part 82AX, for example, a total of three concave portions and convex portions showing the type and the loading orientation of the medium 2 are formed in predetermined combinations and alignments along the lengthwise direction of the operator. Further, in the selected medium notification part 82AY, the type notification part corresponding to the medium type name displayed on the type name display region is positioned in a manner in which it is displaced by 90 degrees in the first rotational direction from the arranged position of the type name display region. Furthermore, at one end of the operator main body 82A, a disc-shaped operation dial 82B that is a size larger than the operator main body 82A is fixed. Also, in the selection operator 82, a pair of supporting shafts 82C and 82D is vertically protruded at the central part of an end face of the operation dial 82B and the other end face of the operator main body 82A. Therefore, the selection operator 82 is supported in a manner in which it is rotatable in the first both rotational directions via the pair of supporting shafts 82C and 82D in a position in which the operator lengthwise direction is made parallel to the cassette widthwise direction by the cassette outer part 81A. With this, in the selection operator 82, the upper side part of the operation dial 82B can be protruded from the dial exposed hole part 81AD of the cassette outer part 81A for rotational operation to rotate the operator main body 82A in the first rotational direction or the first counter-rotational direction according to the rotation operation of the operation dial 82B. Further, in the selection operator 82, a medium type name on one type name display region positioned at the foremost position of the medium type selecting part 82AX is exposed so as to be visible from the outside via the name exposing hole part 81AC of the cassette outer part 81A. Therefore, the selection operator 82 can rotate the operator main body 82A according to the rotation operation of the operation dial 82B to switch the medium type name to be visible via the name exposing hole part 81AC. In this way, in the selection operator 82, the type and the loading orientation of the medium 2 loaded to the medium cassette 81 can be selected as one medium type name to be visible via the name exposing hole part 81AC.

Further, the selection type operator 83 is equipped with three push switches (hereinafter may be referred to as first to third switches) 83A to 83C. The first to third switches 83A to 83C are arranged so as to be aligned in a line along the cassette widthwise direction in a state in which the front ends of each of the push button parts 83AX to 83CX are facing one type notification part positioned at the lowermost side of the selected medium notification part 82AY. In this way, in the first to third switches 83A to 83C, the front ends of the push button parts 83AX to 83CX are facing the total of three concave parts and convex parts along the operator lengthwise directions (that is, the cassette widthwise direction) of the type notification part one by one. Further, as shown in FIG. 9, in the first to third switches 83A to 83C, in a case where the push button parts 83AX to 83CX face the convex parts of the type notification parts, the push button parts 83AX to 83CX are pushed by the convex parts and become an ON state. With this, the first to third switches 83A to 83C output detection signals of logic level "H" showing an ON state. Further, in the first to third switches 83A to 83C, in a case where the push button parts 83AX to 83CX face the concave parts of the type notification parts, the front ends of the push button parts 83AX to 83CX enter into the concave parts so that the push button parts 83AX to 83CX are not pushed and become an OFF state. With this, the first to third switches 83A to 83C output detection signals of logic level "L" showing an OFF state. In this way, the selection type operator 83 detects the medium type name selected by the rotation operation of the selection operator 82 with the first to third switches 83A to 83C via the type notification parts. Also, the selection type operator 83 can output a total of three detection signals showing the detected medium type name with a combination of detection signals of logic level "H" or detection signals of logic level "L" from the first to third switches 83A to 83C.

In fact, the selection type operator 83 is equipped with a cassette side connector (not illustrated) electrically connected to the first to third switches 83A to 83C, and for example, the cassette side connector is attached to a predetermined position on the outer surface of the cassette rear wall part 21D of the medium cassette 81. Further, in the printer case 3, for example, a printer side connector (not illustrated) corresponding to the cassette side connector is arranged on the rear side of the cassette install part 3C, and the printer side connector is electrically connected to a later explained control part in the printer case 3. Therefore, in a case where the medium cassette 81 is installed in the cassette install part 3C of the printer case 3, the selection type operator 83 electrically and mechanically connects the cassette side connector to the printer side connector to electrically connect the first to third switches 83A to 83C to the control part. With this, the selection type operator 83 operates the first to third switches 83A to 83C from the electric flow from the control part in a case where the medium cassette 81 is installed to the cassette install part 3C and can detect the selected medium type name from the rotational operation of the selection operator 82. Also, the selection type operator 83 can transmit three detection signals showing the detection results from the first to third switches 83A to 83C to the control part. In this way, the selection type operator 83 can notify the selected medium type name to the control part from the rotational operation of the selection operator 82 using the combinations of logic level "H" and logic level "L" of the three detection signals.

(2-3) Structure of Monochrome Printer

Figure 10:
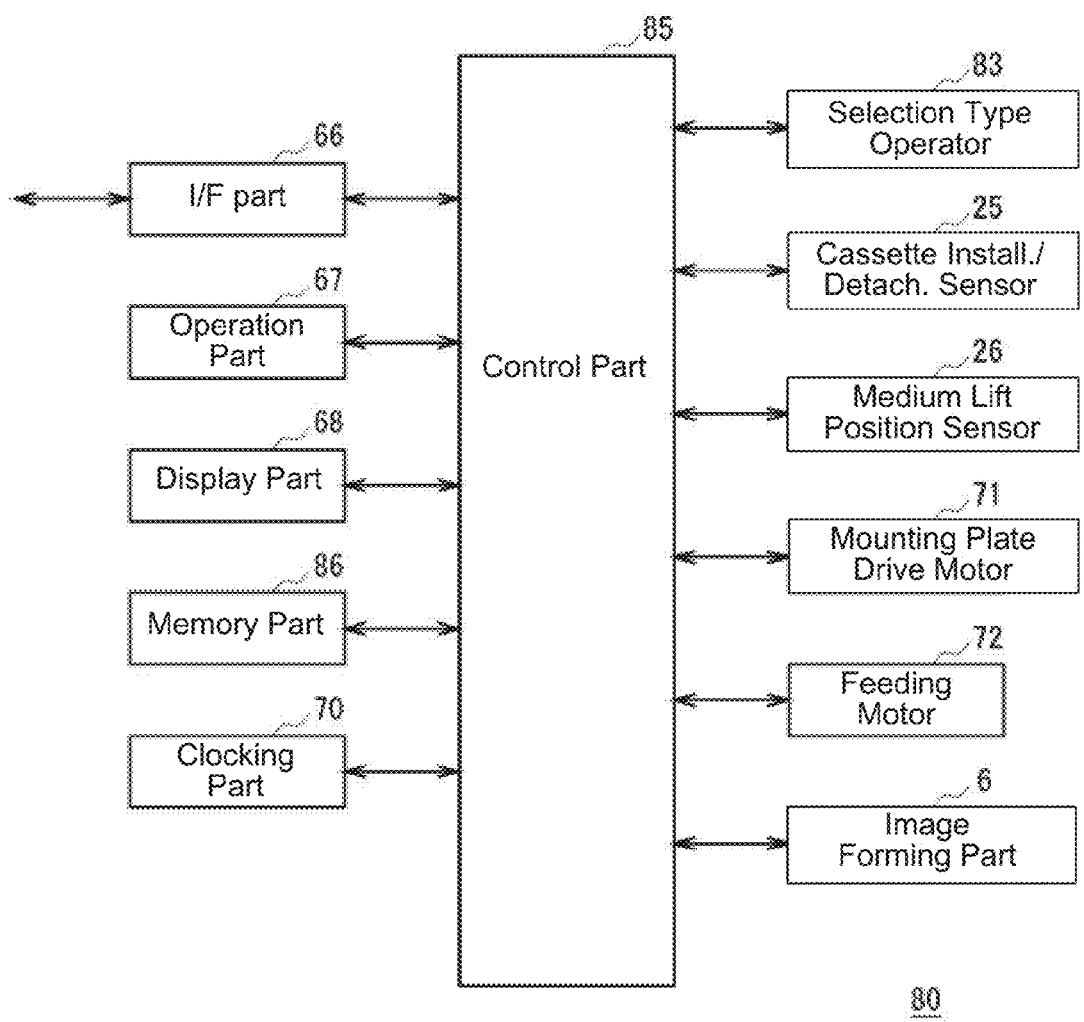
FIG. 10 is a block diagram showing a circuit configuration of a monochrome printer.

Next, the structure of the circuit of the monochrome printer 80 will be explained with reference to FIG. 10 using the same symbols for parts corresponding to FIG. 4.

The monochrome printer 80 is equipped with, for example, a control part 85 having a structure of a microprocessor and a memory part 86 such as a hard disc drive or a semiconductor memory in which a second setting screen display control processing program having a partially different content as the first setting screen display control processing program according to Embodiment 1 is stored in advance. Further, the monochrome printer 80 has a similar structure as the monochrome printer 1 according to the aforementioned first embodiment, with the exception that a selection type operator 83 is connected to the control part 85 and the second setting screen display control process procedure having a partially different process than the first setting screen display control process procedure RT1 according to the second setting screen display control process program is executed. In this case, in the control part 85, for example, to detect the medium type name showing the type and the load orientation of the medium 2 loaded in the medium cassette 81, a data table showing the correspondence between a plurality of medium type names selectable via the selection operator 82 as shown in FIG. 9 and the ON or OFF state of each of the first to third switches 83A to 83C in case the medium type name is selected are stored to the memory part 86 in advance. Further, when the control part 85 detects from the cassette installation/detachment sensor 25 that the medium cassette 81 has detached from the cassette install part 3C, it starts clocking with the first timer in a similar manner as the control part 65 according to the aforementioned first embodiment. Then, when the control part 85 detects with the cassette installation/detachment sensor 25 that the medium cassette 81 is installed in the cassette install part 3C before the first timer clocking time reaches the first setting time, it operates the first to third switches 83A to 83C of the selection type operator 83 as described above and fetches the three detection signals transmitted from the first to third switches 83A to 83C. With this, the control part 85 detects the medium type name showing the type and the loading orientation of the medium 2 loaded in the medium cassette 81 based on the signal level of each of the three detection signals and the medium type detection table.

Now, in the control part 85, since the medium type name is not detected before the first installation/detachment of the medium cassette 81 to and from the cassette install part 3C, the medium type name it detected is not stored in the memory part 86. However, when the control part 85 detects the medium type name on and after the second installation/detachment of the medium cassette 81 to and from the cassette install part 3C, the medium type name information showing the detected medium type name is stored in the memory part 86 for the display control of the medium setting screen at the next installation/detachment of the medium cassette 81. It should be noted that when the medium type name detected from the previous installation/detachment of the medium cassette 81 is already stored in the memory part 86 as the medium type name information when the control part 85 detects the medium type name according to the installation/detachment of the medium cassette 81, the medium type name information showing one medium type name detected this time is written over the medium type name information that is already stored in the memory part 86 after the medium type name detected this time is used for the control of the display of the medium setting screen. In this way, the control part 85 stores the medium type name information showing the medium type name detected most recently in the past to the memory part 86 for the display control of the medium setting screen, and after using it for the control of the display of the medium setting screen, it is updated to the latest information. It should be noted that, in the following explanation, the medium type name that the control part 85 detects when the medium cassette 81 to installed to the cassette install part 3C may be referred to as the current medium type name and the medium type name detected at the time of the previous installation (that is, one installation before) of the medium cassette 81 to the cassette install part 3C may be referred to as the previous medium type name.

Therefore, when the control part 85 detects the current medium type name when the medium cassette 81 is installed in the cassette install part 3C before the first timer clocking time reaches the first setting time, it retrieves the medium type name information showing the previous medium type name from the memory part 86.

Then, the control part 85 compares the current medium type name and the previous medium type name and discerns whether or not the current medium type name is changed so as to be different from the previous medium type name. As a result, when the current medium type name is the same as the previous medium type name, the control part 85 does not display the medium setting screen on the display part 68 since there is no need to change the setting of the medium 2. That is, the control part 85 determines that the type and the loading orientation of the medium 2 loaded in the medium cassette 81 installed in the cassette install part 3C has not been changed at all and does not display the medium setting screen.

On the other hand, when the current medium type name is different from the previous medium type name, the control part 85 determines that there is a need to change the medium 2 setting, and displays the medium setting screen on the display part 68. That is, since there is a possibility that a medium 2 is loaded again to the medium cassette 81 (that is, a different type of medium 2 from before the detachment is loaded, or the same type of medium 2 as before the detachment is loaded in a different loading orientation), the control part 85 displays the medium setting screen on the display part 68. With this, the control part 85 can allow a user to input the medium setting information relating to the medium 2 via the operation part 67 according to the guidance of the medium setting screen, and on top of that, when the termination of the display is instructed via the operation part 67, it terminates the display of the medium setting screen to the display part 68 accordingly. It should be noted that, in the control part 85, for example, when the selection operator 82 is erroneously operated to rotate at the time of the installation/detachment of the medium cassette 81 to and from the cassette install part 3C due to a hand coming in contact with the operation dial 82B, etc., the medium setting screen is displayed on the display part 68. However, at this time, when the termination of the display is instructed by a user via the operation part 67 according to the guidance of the medium setting screen at this point, the control part 85 can terminate the display of the medium setting screen for the display part 68 accordingly.

Further, in the control part 85, when it has detected from the cassette installation/detachment sensor 25 that the medium cassette 81 is still detached from the cassette install part 3C after the first timer clocking time has reached the first setting time, since there is a possibility that mediums 2 were replenished in the medium cassette 81 or that mediums 2 were loaded again, it displays the medium setting screen on the display part 68. With this, the control part 85 can allow a user to input the medium setting information relating to the medium 2 via the operation part 67 according to the guidance of the medium setting screen, and on top of that, when the termination of the display is instructed via the operation part 67, it terminates the display of the medium setting screen to the display part 68 accordingly. Now, when the control part 85 displays the medium setting screen on the display part 68 and arbitrarily terminates the display of the medium setting screen after the input of the medium setting information, for example, when the medium cassette 81 is installed in the cassette install part 3C and the current medium type name is already detected, the medium type information showing the previous medium type name is stored in the memory part 86 as the previous medium type name used for the control of the display of the medium setting screen at the time of the next installation/detachment of the medium cassette 81. On the other hand, when the control part 85 displays the medium setting screen while the medium cassette 81 is not installed in the cassette install part 3C and arbitrarily terminates the display of the medium setting screen after inputting the medium setting information, it waits until the medium cassette 81 has been installed to the cassette install part 3C. Then, when the control part 85 detects from the cassette installation/detachment sensor 25 that the medium cassette 81 has been installed to the cassette install part 3C, it detects the current medium type name in a similar manner as described above and stores it in the memory part 86 as the medium type name information showing the medium type name.

Furthermore, in a case where the medium setting screen is displayed on the display part 68 in a state in which the medium cassette 81 is not installed in the cassette install part 3C, when the control part 85 detects from the cassette installation/detachment sensor 25 that the medium cassette 81 has been installed to the cassette install part 3C while the operation part 67 is not operated at all, it detects the current medium type name in a similar manner as described above and stores them in the memory part 86 as a medium type name information showing the medium type name. Then, the control part 85 starts clocking with the second timer in a similar manner as the control part 65 according to the aforementioned first embodiment. On the other hand, when the control part 85 displays the medium setting screen on the display part 68 in a state in which the medium cassette 81 is installed in the cassette install part 3C, by using the current medium type name that was already detected as the previous medium type name, it stores the medium type name information showing the previous medium type name in the memory part 86. Then, the control part 85 starts clocking with the second timer in a similar manner as the control part 65 according to the aforementioned first embodiment. It should be noted that, after the control part 85 starts clocking with the second timer, it follows a similar process as the control part 65 according to the aforementioned first embodiment. In this way, the control part 85 can arbitrarily input the medium setting information according to the installation/detachment of the medium cassette 81 to the cassette install part 3C, and set the type, the loading direction, etc., of the medium 2 to be used for forming a print image in relation to the medium cassette 81. Further, in the second embodiment, the control part 85 can also display the medium setting screen on the display part 68 and have the medium setting information inputted not only at the time of the installation/detachment of the medium cassette 81 to the cassette install part 3C but when the display of the medium setting screen is requested by a user via the operation part 67. Therefore, for example, even in a case where the type, the loading orientation, etc., of the medium 2 to be used for forming a print image in relation to the medium cassette 81 are erroneously set, the control part 85 can have the medium setting information inputted again at an arbitrary timing to correct the setting.

(2-4) Second Setting Screen Display Control Process Procedure

Figure 11:
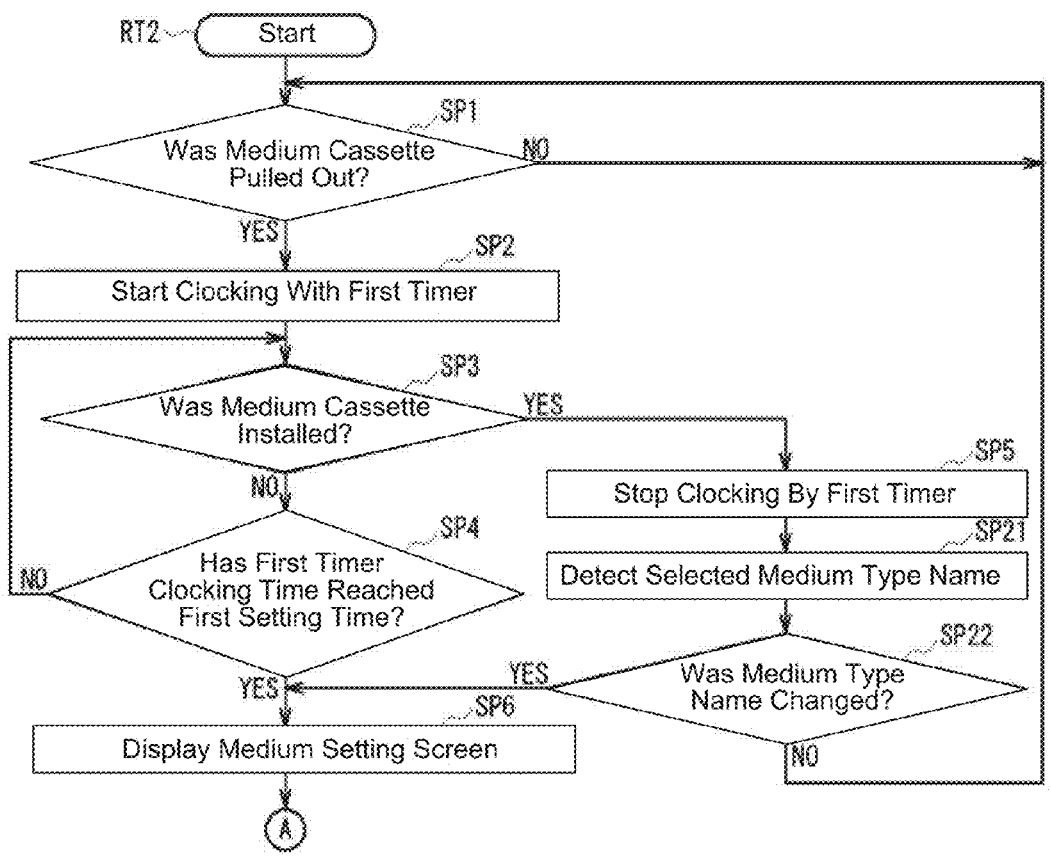
FIG. 11 is a flowchart showing a second setting screen display control process procedure (1).
Figure 12:
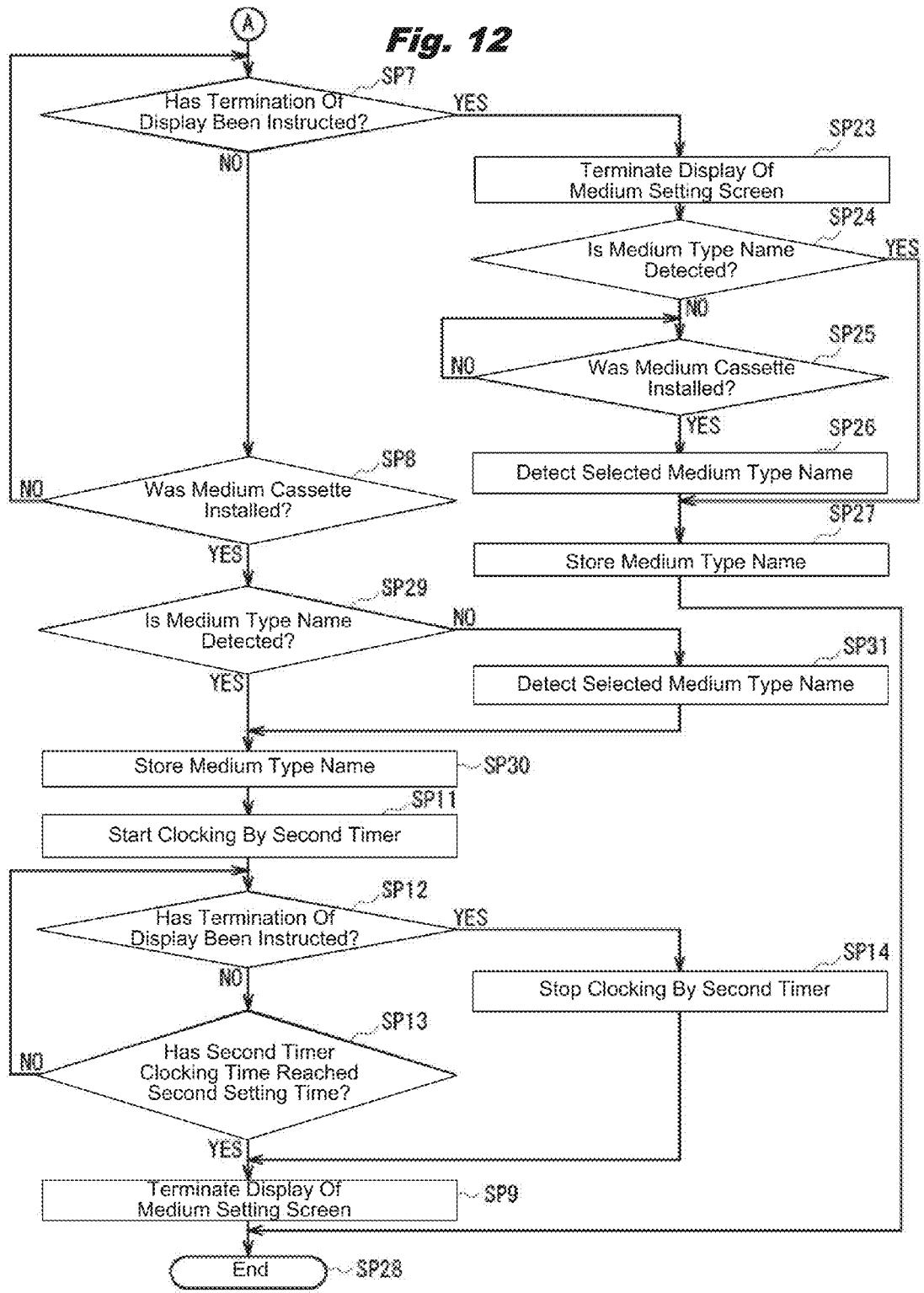
FIG. 12 is a flowchart showing a second setting screen display control process procedure (2).

Next, the second setting screen display control process procedure RT2 executed by the control part 85 will be explained using the flow chart as shown in FIG. 11 and FIG. 12 using the same symbols as FIG. 5 for the corresponding parts. For example, after starting the monochrome printer 80 according to the start-up operation of the operation part 67, the control part 85 starts the second setting screen display control process procedure RT2 as shown in FIG. 11 and FIG. 12 according to the second setting screen display control process program retrieved from the memory part 86. After starting the second setting screen display control process procedure RT2, the control part 85 cyclically and repeatedly executes the processes of Step SP3 and Step SP4 after sequentially executing the processes of Step SP1 and Step SP2. Further, in Step SP4, in a case where the first timer clocking time reaches the first setting time before the medium cassette 81 is installed in the cassette install part 3C, the control part 85 shifts to the next Step SP6. On the other hand, in Step SP3, when the control part 85 detects with the cassette installation/detachment sensor 25 that the medium cassette 81 is installed to the cassette install part 3C before the first timer clocking time reaches the first setting time, it executes the process of Step SP5 then shifts to the next Step SP21. In Step SP21, the control part 85 detects the medium type name showing the type and the loading orientation of the medium 2 loaded in the medium cassette 81 based on the three detection signals provided from the first to third switches 83A to 83C of the selection type operator 83 and the medium type detection table, then it shifts to the next Step SP22. In Step SP22, the control part 85 retrieves the medium type name information from the memory part 86, compares the current medium type name and the previous medium type name, and discerns whether or not the current medium type name is changed so as to be different from the previous medium type name based on the comparison result. Then, in Step SP22, when the current medium type name is the same as the previous medium type name and the control part 85 obtains an affirmative result, it does not display the medium setting screen on the display part 68 and returns to Step SP1. Also, in Step SP22, when the current medium type name is different from the previous medium type name and the control part 85 obtains a negative result, it shifts to Step SP6.

In Step SP6, the control part 85 displays a medium setting screen on the display part 68 and continues to cyclically and repeatedly execute the processes of Step SP7 and SP8. Further, in Step SP7, when a medium setting screen is arbitrarily inputted via the operation part 67 according to the content of the medium setting screen and the termination of the display of the medium setting screen is instructed, the control part 85 obtains a negative result and shifts to Step SP23 to terminate the display of the medium setting screen on the display part 68 and then shifts to the next Step SP24 (that is, after deleting the display of the medium setting screen). In Step SP24, the control part 85 determines whether or not the current medium type name is already detected. At this time, in Step SP24, the control part 85 executes the process of Step SP4, then executes the process of Step SP6, and while continuing to execute the process of Step SP7, and since the medium cassette 81 is not yet installed in the cassette install part 3C and the current medium type name is not detected, it obtains a negative result and shifts to the next Step SP25. Then, in Step SP25, the control part 85 waits until the medium cassette 81 is installed in the cassette install part 3C, and when it detects from the cassette installation/detachment sensor 25 that the medium cassette 81 is installed in the cassette install part 3C, it shifts to the next Step SP26. With this, in Step SP26, the control part 85 detects the medium type name showing the type and the loading orientation of the medium 2 loaded in the medium cassette 81 based on the three detection signals provided from the first to third switches 83A to 83C of the selection type operator 83 and the medium type detection table, and shifts to the next Step SP27. Therefore, in Step SP27, using the current medium type name as the previous medium type name used for the control of the display of the medium setting screen at the time of the next installation/detachment of the medium cassette 81, the control part 85 stores the medium type name information showing the previous medium type name to the memory part 86, then it shifts to Step SP28 to terminate the setting screen display control process procedure RT2. On the other hand, in Step SP24, after executing the process of Step SP22, the control part 85 executes the process of Step SP26, and while continuing to execute the process of Step SP7, it obtains an affirmative result since the current medium type name is detected and shifts to Step SP27. Then, in Step SP27, using the current medium type name as the previous medium type name, the control part 85 stores the medium type name information showing the previous medium type name to the memory part 86, then it shifts to Step SP28 to terminate the second setting screen display control process procedure RT2.

Further, in Step SP8, while the control part 85 is sequentially executing the processes of Step SP6 and Step SP7 after executing the process of Step SP22, it obtains an affirmative result since the medium cassette 81 is installed to the cassette install part 3C, so it shifts to the next Step SP29. Then, in Step SP29, the control part 85 determines whether or not the current medium type name is detected. At this time, in Step SP29, the control part 85 obtains an affirmative result since the current medium type name is already detected in Step SP21, so it shifts to Step SP30. Therefore, in Step SP30, using the current medium type name as the previous medium type name, the control part 85 stores the medium type name information showing the previous medium type name in the memory part 86 and then shifts to the next Step SP11. On the other hand, in Step SP8, the control part 85 sequentially executes the processes of Step SP6 and Step SP7 after executing the process of Step SP4, so even when obtaining an affirmative result by detecting with the cassette installation/detachment sensor 25 that the medium cassette 81 is installed to the cassette install part 3C, it shifts to the next Step SP29. However, in Step SP29, the control part 85 obtains a negative result since the current medium type name was not already detected at that point, so it shifts to Step SP31. Therefore, in Step SP31, after the control part 85 detects the medium type name showing the type and the loading orientation of the medium 2 loaded in the medium cassette 81 based on the three detection signals provided from the first to third switches 83A to 83C of the selection type operator 83 and the medium type detection table, it executes the process of Step Sp30 and shifts to the next Step SP11. Then, after the control part 85 continuously and arbitrarily executes the processes of Steps SP11 to SP14 and Step SP9, it shifts to Step SP28 and terminates the second setting screen display control process procedure RT2. It should be noted that, in a similar manner as the control part 65 of the aforementioned first embodiment, the control part 85 according to the second embodiment, for example, starts the second setting screen display control process procedure RT2 according to the start-up of the monochrome printer 80, but during the operation of the monochrome printer 80 (that is, during energization), after it terminates the second setting screen display control process procedure RT2, it starts the second setting screen display control process procedure RT2 again. In this way, during the operation of the monochrome printer 80, the control part 85 repeatedly executes the second setting screen display control process procedure RT2, and every time the medium cassette 81 is pulled out from the cassette install part 3C, it arbitrarily displays the medium setting screen on the display part 68 and allows the medium setting information to be inputted.

(2-5) Operation and Effect of Embodiment 2

In the aforementioned structure, in the monochrome printer 80, the medium cassette 81 was provided with a selection operator 82 for selecting the type and the loading orientation of the medium 2 to be loaded to the medium cassette 81 as the medium type name, and a selection type operator 83 for by the rotation operation on the selection operator 82. Further, when the medium cassette 81 is pulled out and detached from the cassette install part 3C of the printer case 3 once and then installed, the control part 85 of the monochrome printer 80 stores the medium type name detected from the selection type operator 83 in the memory part 86 as the previous medium type name. In addition, when the control part 85 of the monochrome printer 80 detects with the cassette installation/detachment sensor 25 that the medium cassette 81 is pulled out from the cassette install part 3C and detached from the cassette install part 3C of the printer case 3 again, it starts the clocking with the first timer. Then, when the control part 85 of the monochrome printer 80 detects with the cassette installation/detachment sensor 25 that the medium cassette 21 is installed in the cassette install part 3C before the first timer clocking time reaches the short first setting time, it compares the medium type name detected at that time by the selection type operator 83 as the current medium type name with the previous medium type name stored in the memory part 86. As a result, when the current medium type name matches the previous medium type name, the control part 85 of the monochrome printer 80 does not display the medium setting screen on the display part 68. According to the aforementioned structure, in a case where the medium cassette 81 is pulled out once from the cassette install part 3C of the printer case 3 and installed again so as to be pushed in by a user to check the type, the loading amount, the loading orientation, etc., of the medium 2 loaded in the medium cassette 81, by comparing the current medium type name and the previous medium type name, the monochrome printer 80 accurately confirms that the installation/detachment of the medium cassette 81 from the cassette install part 3C was to check the medium 2, so it can avoid displaying the medium setting screen on the display part 68. With this, in a case where the medium cassette 81 is installed to/detached from the cassette install part 3C to check the medium 2, the monochrome printer 80 can assuredly free the user from the troublesomeness of operating the operation part 67 to terminate the display of the medium setting screen, or waiting until the display is automatically terminated and thereby improve the usability.

In addition, in the monochrome printer 80, when the medium cassette 21 is installed in the cassette install part 3C before the first timer clocking time reaches the first setting time and when the current medium type name and the previous medium type name were compared and they do not match, the medium setting screen is displayed on the display part 68. With this, when the medium cassette 21 is pulled out from the cassette install part 3C of the printer case 3 and, for example, in such a case in which the type or the loading orientation of the medium 2 to be loaded is quickly changed, the monochrome printer 80 can automatically display the medium setting screen to guide the input of the medium setting information without performing an operation to display the medium setting screen on the display part 68, thereby further improving the usability.

(3) Third Embodiment (3-1) Structure of Monochrome Printer

Figure 13:
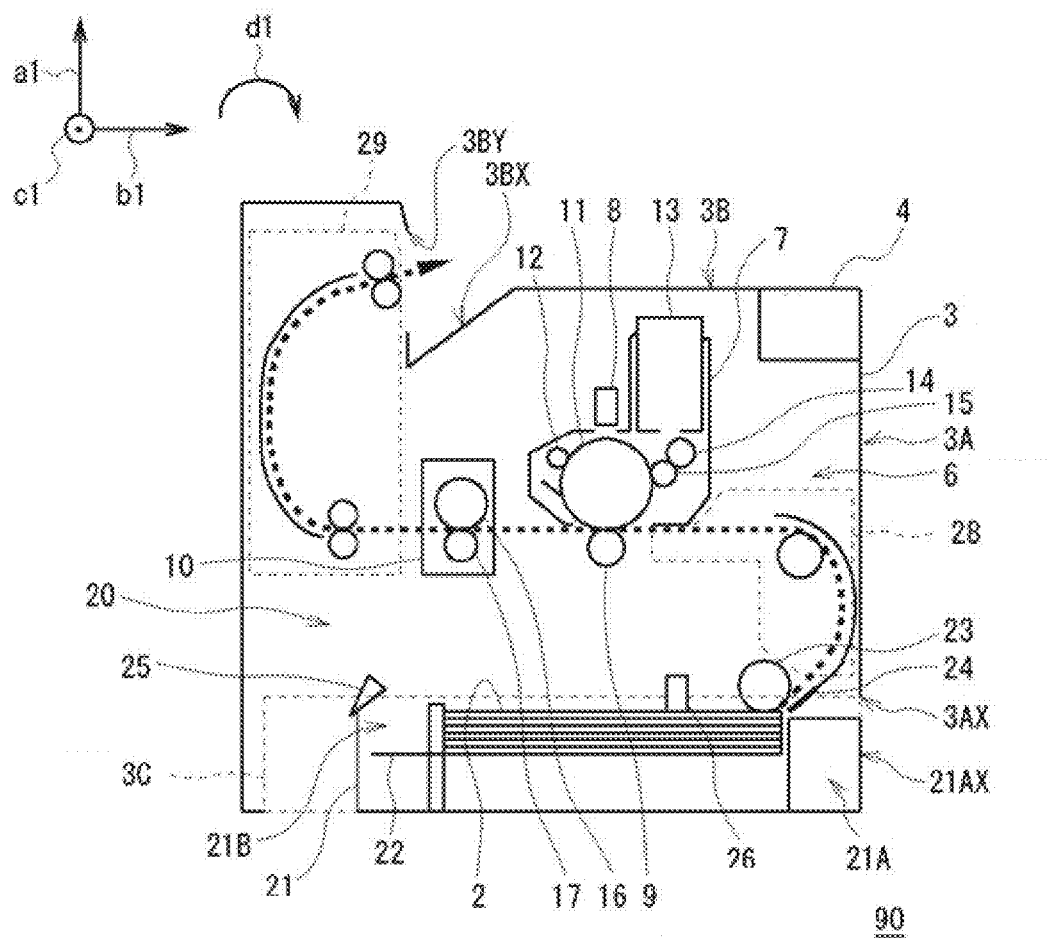
FIG. 13 is a schematic side view showing an internal configuration of a monochrome printer according to a third embodiment.

Next, the structure of the monochrome printer 90 according to the third embodiment will be explained with reference to FIG. 13 which uses the same symbols for parts corresponding to FIG. 1. The monochrome printer 90 has the same structure as the monochrome printer 1 according to the aforementioned first embodiment, with the exception that a part of the processes executed by a later explained control part. Therefore, in the following, the configuration of the circuit of the monochrome printer 90 according to the third embodiment and the process executed by the control part will be explained, and since the structure of the monochrome printer 1 according to the aforementioned first embodiment with reference to FIG. 1 can be referenced, the explanation for the other configurations will be omitted here.

(3-2) Circuit Configuration of Monochrome Printer

Figure 14:
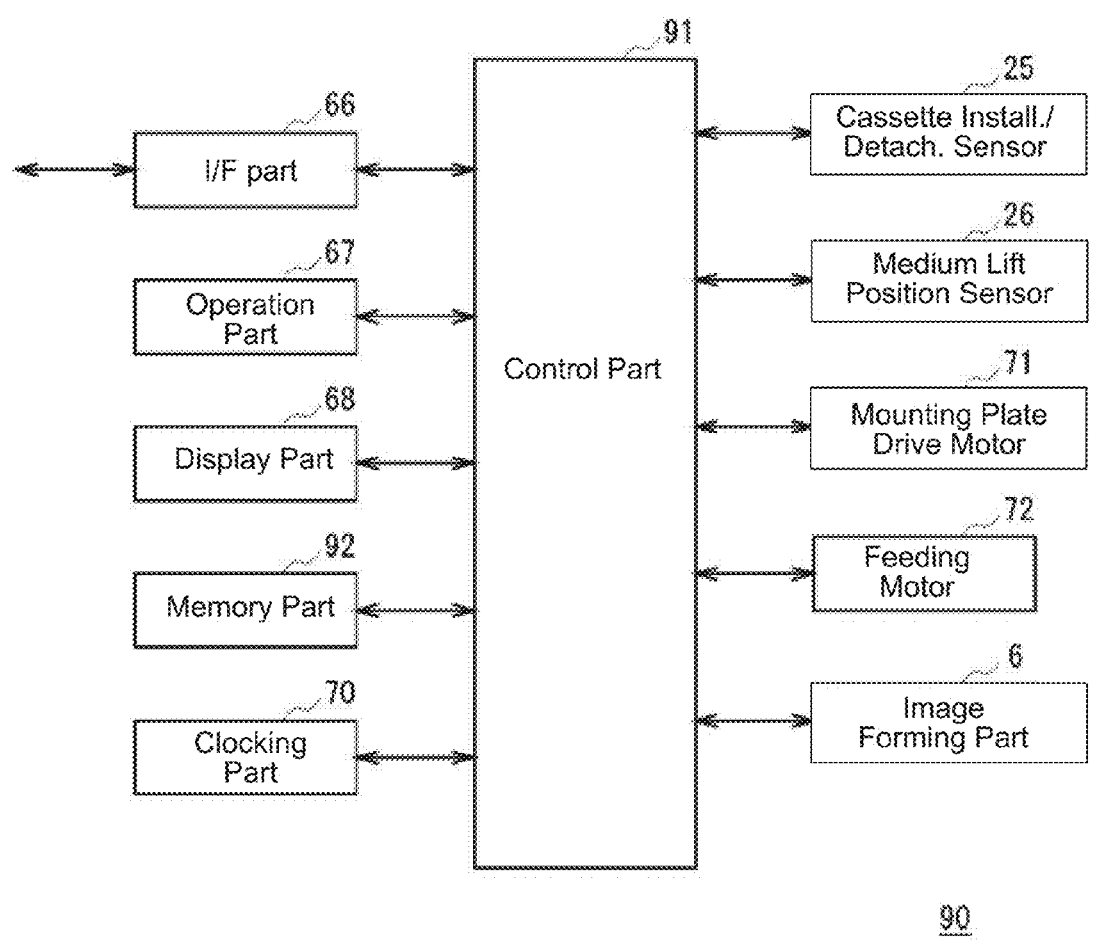
FIG. 14 is a block diagram showing a circuit configuration of a monochrome printer.

Next, the structure of the circuit of the monochrome printer 90 will be explained with reference to FIG. 14 which uses the same symbols for parts corresponding to FIG. 4. The monochrome printer 90 is equipped with, for example, a control part 91 having a structure of a microprocessor and a memory part 92 such as a hard disc drive or semiconductor memory to which a third setting screen display control processing program having a partially different content as the first setting screen display control processing program according to Embodiment 1 is stored in advance. Further, the monochrome printer 90 has a similar structure as the monochrome printer 1 according to the aforementioned first embodiment, with the exception that a selection type operator 91 executes the third setting screen display control process procedure having a partially different process from the first setting screen display control process procedure RT1, according to the third setting screen display control process program. In this case, when the medium cassette 21 is pulled out and detached from the cassette install part 3C of the printer case 3, as described above, the medium mounting plate 22 descends to the lower limit position in the elevation range from its own weight. Therefore, when the control part 91 detects from the cassette installation/detachment sensor 25 that the medium cassette 21 has been installed to the cassette install part 3C, it operates the mounting plate drive motor 71 as described above to elevate the medium mounting plate 22 from the lower limit position in the elevation range and presses the uppermost medium 2 to the feeding roller 23. At this time, the control part 91 detects an approximate loading amount of the mediums 2 in the medium cassette 21 as the motor driving amount of the mounting plate drive motor 71 and stores the motor driving amount information showing the motor driving amount to the memory part 92. It should be noted that, for example, when the mounting plate drive motor 71 is a pulse motor, the motor driving amount is a pulse number provided to the mounting plate drive motor 71 to elevate the mounting plate elevating part 35. Further, for example, when the mounting plate drive motor 71 is a continuous current motor having a rotation detector, the motor driving amount is the number of rotations of the motor output shaft detected via the rotation detector when the mounting plate drive motor 71 was operated to elevate the mounting plate elevating part 35.

Also, in the monochrome printer 90, when the mediums 2 are fed from the medium cassette 21 from the time of the installation to the detachment of the medium cassette 21 to/from the cassette install part 3C, the loaded amount of the medium 2 decreases for that amount. Therefore, after elevating the medium mounting plate 22 from the lower limit position in the elevation range and further operating the mounting plate drive motor 71 to elevate the medium mounting plate 22 according to the feeding of the medium 2 from the medium cassette 21 as described above, the control part 91 retrieves the motor drive amount information already stored in the memory part 92. Then, the control part 91 adds the motor driving amount when the mounting plate drive motor 71 was further operated to the motor driving amount shown by the motor driving amount information retrieved from the memory part memory part 92, and stores the obtained addition result (that is, the total of the motor driving amount) to the memory part 92 as the new motor driving amount information. In this way, between the time of the installation to the time of the detachment of the medium cassette 21 to/from the cassette install part 3C, to show the loaded amount which changes as the medium 2 is fed from the medium cassette 21, the control part 91 detects the motor driving amount every time the mounting plate drive motor 71 is operated and sequentially adds them. Further, the control part 91 stores the motor driving amount information showing the addition result to the memory part 92 for the display control of the medium setting screen at the time of the installation/detachment of the next medium cassette 21. It should be noted that, in a case where the motor driving amount information is already stored in the memory part 92 when storing the motor driving amount information to the memory part 92, the control part 91 overwrites the motor driving amount information that is already stored in the memory part 92 with a new motor driving processing information to update the motor driving amount information to show the latest motor driving amount. In the following explanation, the motor driving amount shown by the motor driving amount information that was arbitrarily updated and stored between the time of the installation to the time of detachment of the medium cassette 21 to the cassette install part 3C (that is, the motor driving amount information that was stored last between the time of the installation to the time of detachment) is also referred to as the motor driving amount before the detachment. Furthermore, in the following explanation, the motor driving amount when operating the mounting plate drive motor 71 to elevate the medium mounting plate 22 from the lower limit position in the elevation range to a position at which the uppermost medium 2 is pressed against the feeding roller 23 from the installation of the medium cassette 21 to the cassette install part 3C is also specifically referred to as the motor driving amount at the time of installation.

In fact, when the control part 91 detects from the cassette installation/detachment sensor 25 that the medium cassette 21 has detached from the cassette install part 3C, it starts clocking with the first timer in a similar manner as the control part 65 according to the aforementioned first embodiment. Then, when the control part 91 detects with the cassette installation/detachment sensor 25 that the medium cassette 21 is installed to the cassette install part 3C before the first timer clocking time reaches the first setting time, it operates the mounting plate drive motor 71. With this, the control part 91 elevates the medium mounting plate 22 from the lower limit position in the elevation range to a position at which the uppermost medium 2 is pressed against the feeding roller 23, and the motor driving amount of the mounting plate drive motor 71 at this time is detected as the motor driving amount at the time of installation. Also, the control part 91 retrieves the motor driving amount information from the memory part 92 and compares the motor driving amount at the time of installation to the motor driving amount before detachment as shown by the motor driving amount information. That is, for example, the control part 91 subtracts the motor driving amount at the time of installation from the motor driving amount before detachment and calculates the absolute value of the obtained difference as the difference of the driving amount. Then, the control part 91 determines whether or not the difference of the driving amount is a value within a comparatively narrow prescribed range that is selected in advance. As a result, when the difference in the driving amount is within the prescribed range, since the loaded amount of the medium 2 in the medium cassette 21 has not changed before and after the installation/detachment of the medium cassette 21, the control part 91 determines that the type and the loaded orientation of the medium 2 loaded in the medium cassette 21 has not changed before and after the installation/detachment, and therefore, it does not display the medium setting screen on the display part 68. That is, the control part 91 determines that the installation/detachment of the medium cassette 21 at this time is for checking the medium 2 loaded in the medium cassette 21 and therefore that there is no need to specifically change the setting of the medium 2, and does not display the medium setting screen. Further, using the motor driving amount at the time of installation that was detected at that time as the new motor driving amount before the detachment, the control part 91 stores the motor driving amount information showing the motor driving amount before the detachment to the memory part 92.

On the other hand, when the difference in the driving amount is outside the prescribed range, since the loaded amount of the medium 2 in the medium cassette 21 has changed largely before and after the installation/detachment of the medium cassette 21, the control part 91 determines that there is a possibility that the type and the loaded orientation of the medium 2 loaded in the medium cassette 21 has changed before and after the installation/detachment, and therefore displays the medium setting screen on the display part 68. With this, the control part 91 can allow the input of the medium setting information relating the medium 2 via the operation part 67 according to the guidance of the medium setting screen, and on top of that, when the termination of the display is instructed via the operation part 67, it accordingly terminates the display of the medium setting screen to the display part 68. Further, in the control part 91, when it has detected from the cassette installation/detachment sensor 25 that the medium cassette 21 is still detached from the cassette install part 3C after the first timer clocking time has reached the first setting time, since there is a possibility that mediums 2 were replenished in the medium cassette 21 or that mediums 2 were loaded again, it displays the medium setting screen on the display part 68. With this, the control part 91 can allow the input of the medium setting information relating the medium 2 via the operation part 67 according to the guidance of the medium setting screen, and on top of that, when the termination of the display is instructed via the operation part 67, it accordingly terminates the display of the medium setting screen to the display part 68. Now, when the control part 91 displays the medium setting screen and arbitrarily terminates the display of the medium setting screen after the input of the medium setting information, for example, when the medium cassette 21 is installed in the cassette install part 3C and the medium mounting plate 22 is elevated, the motor driving amount information showing the motor driving amount before detachment is stored in the memory part 92, in which the motor driving amount at the time of installation that was detected at that time is used as the new motor driving amount before detachment. On the other hand, the control part 91 displays the medium setting screen while the medium cassette 21 is not installed in the cassette install part 3C and arbitrarily terminates the display of the medium setting screen after the input of the medium setting information. Then, the control part 91 waits for the medium cassette 21 to be installed to the cassette install part 3C. Then, when the control part 91 detects from the cassette installation/detachment sensor 25 that the medium cassette 21 has been installed to the cassette install part 3C, it elevates the medium mounting plate 22 in a similar manner as described above and detects the motor driving amount at the time of installation. Further, using the motor driving amount at the time of installation that was detected at that time as the new motor driving amount before the detachment, the control part 91 stores the motor driving amount information showing the motor driving amount before the detachment to the memory part 92.

Furthermore, in a case where the medium setting screen is displayed on the display part 68 in a state in which the medium cassette 21 is not installed in the cassette install part 3C, when the control part 91 detects from the cassette installation/detachment sensor 25 that the medium cassette 81 has been installed to the cassette install part 3C while the operation part 67 is not operated at all, it elevates the medium mounting plate 22 in a similar manner as described above and detects the motor driving amount at the time of installation. Further, using the motor driving amount at the time of installation that was detected at that time as the new motor driving amount before the detachment, the control part 91 stores the motor driving amount information showing the motor driving amount before the detachment to the memory part 92. Then, the control part 91 starts clocking with the second timer in a similar manner as the control part 65 according to the aforementioned first embodiment. On the other hand, when the control part 91 displays the medium setting screen on the display part 68 in a state in which the medium cassette 21 is installed in the cassette install part 3C, using the motor driving amount at the time of installation that was already detected at that time as the new motor driving amount before the detachment, it stores the motor driving amount information showing the motor driving amount before the detachment to the memory part 92. Then, the control part 91 starts clocking with the second timer in a similar manner as the control part 65 according to the aforementioned first embodiment. It should be noted that, after the control part 91 starts clocking with the second timer, it follows a similar process as the control part 65 according to the aforementioned first embodiment. In this way, according to the installation/detachment of the medium cassette 21 to the cassette install part 3C, the control part 91 can arbitrarily set the type of the medium 2 to be used for forming a print image, the loading direction in relation to the medium cassette 21, etc., from the medium setting information. Further, in the third embodiment, the control part 91 can also display the medium setting screen on the display part 68 and have the medium setting information inputted not only at the time of the installation/detachment of the medium cassette 21 to the cassette install part 3C but when the display of the medium setting screen is requested via the operation part 67. Therefore, for example, even in a case where the type of the medium 2 to be used for forming a print image, the loading orientation to the medium cassette 21, etc., are erroneously set, the control part 91 can have the medium setting information inputted again at an arbitrary timing to correct the setting.

(3-3) Third Setting Screen Display Control Process Procedure

Figure 15:
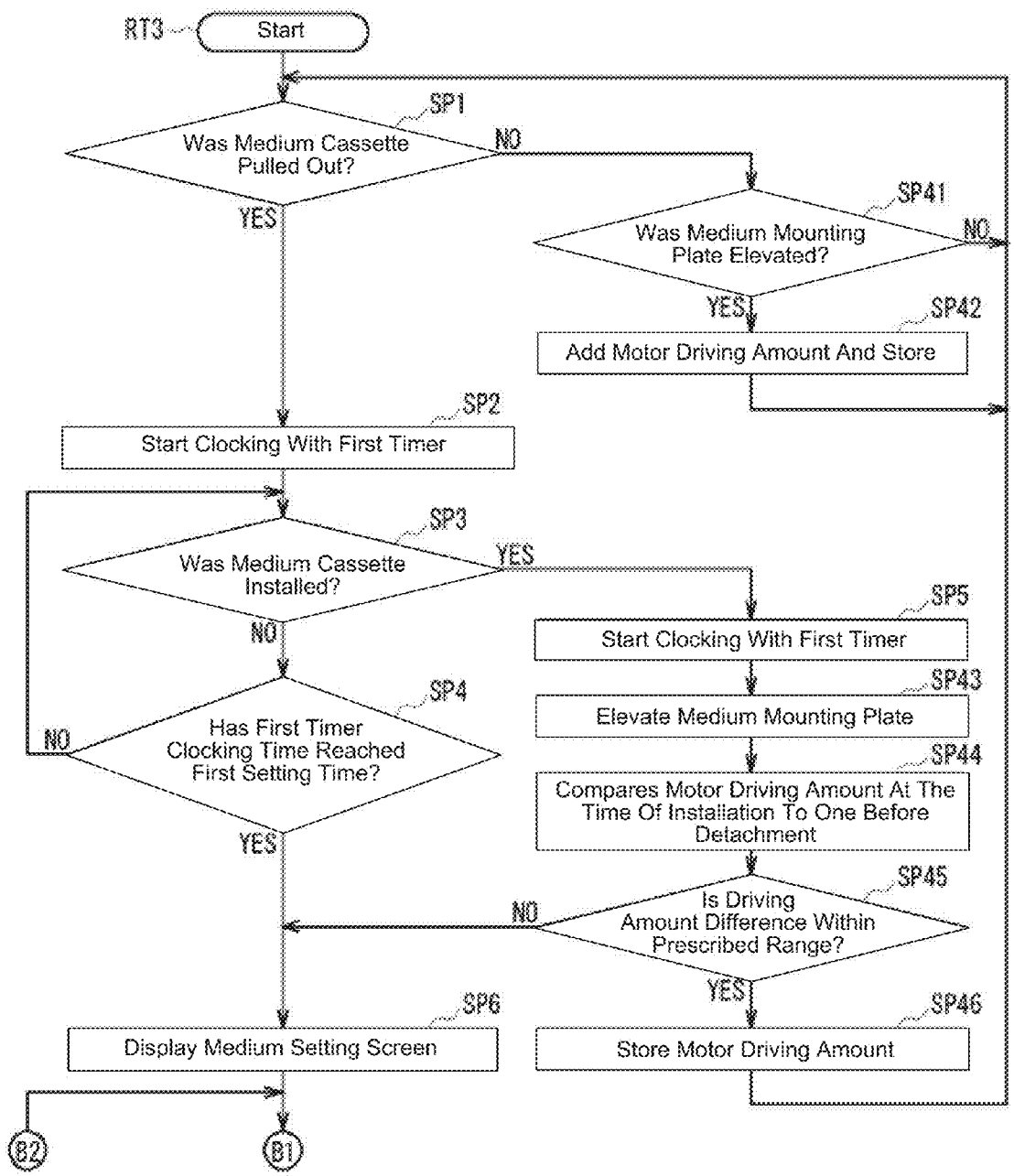
FIG. 15 is a flowchart showing a third setting screen display control process procedure (1).
Figure 16:
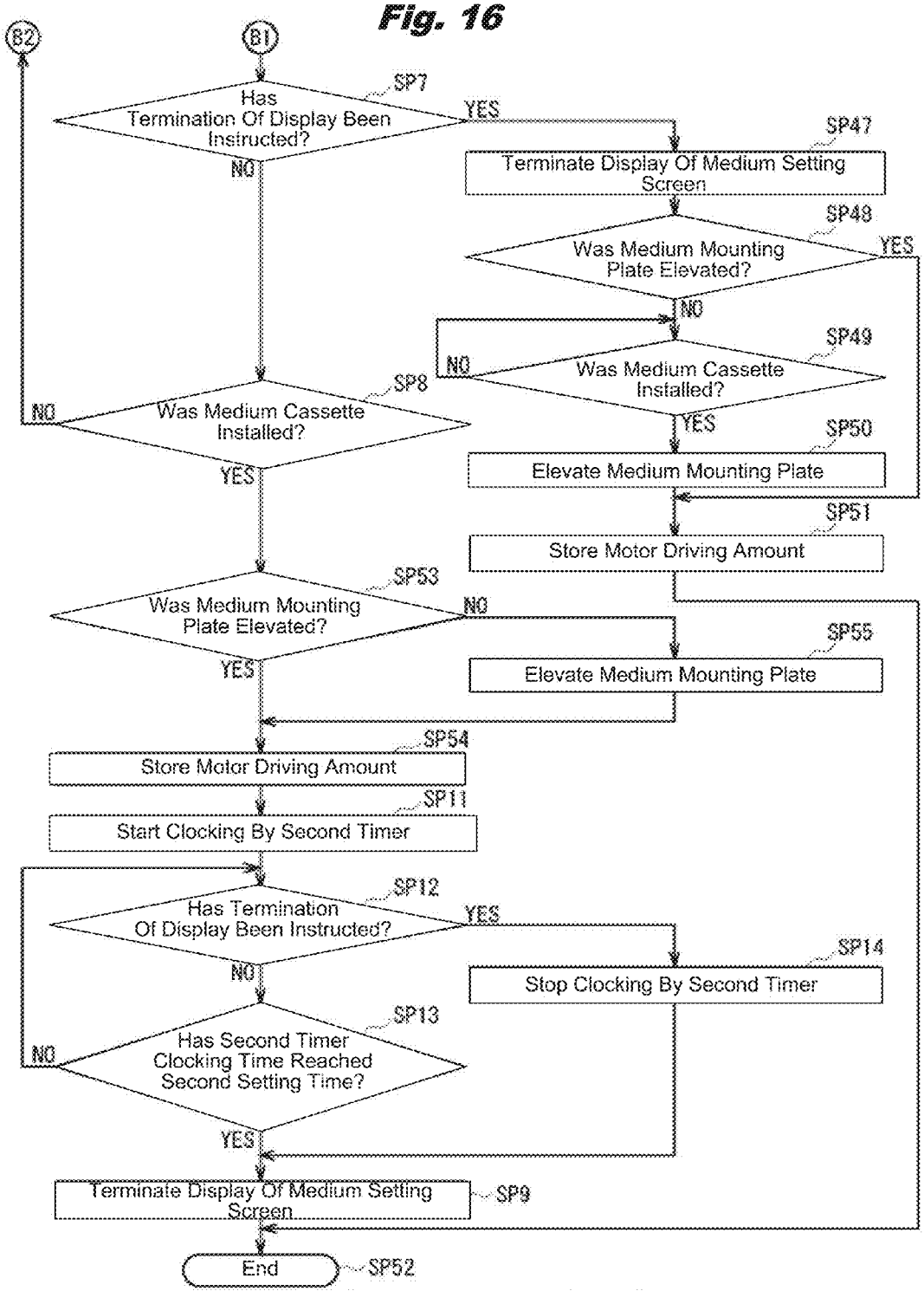
FIG. 16 is a flowchart showing a third setting screen display control process procedure (2).

Next, the third setting screen display control process procedure RT3 executed by the control part 91 will be explained using the flow chart as shown in FIG. 15 and FIG. 16 using the same symbols as FIG. 5 for the corresponding parts. For example, after automatically starting the monochrome printer 90 according to the start-up operation of the operation part 67, the control part 91, starts the third setting screen display control process procedure RT3 as shown in FIG. 15 and FIG. 16 according to the third setting screen display control process program retrieved from the memory part 92. The control part 91 starts the third setting screen display control process procedure RT3 and then executes the process of Step SP1, and when a negative result is obtained since the medium cassette 21 is installed in the cassette install part 3C, it shifts to Step SP41. In Step SP41, the control part 91 determines whether or not the medium mounting plate 22 of the medium cassette 21 is elevated. At this time, in Step SP41, when the control part 91 obtains a negative result since the medium mounting plate 22 of the medium cassette 21 is not specifically elevated, it returns to Step SP1. With this, after that, the control part 91 cyclically and repeatedly executes the processes of Step SP1 and Step SP41 until it obtains an affirmative result from either Step SP1 or Step SP41, and waits for the medium cassette 21 to be pulled out and detached from the cassette install part 3C or to elevate the medium mounting plate 22 of the medium cassette 21. Further, in Step SP41, when the control part 91 operates the mounting plate drive motor 71 according to the feeding of the medium 2 from the medium cassette 21 and elevates the medium mounting plate 22 and therefore obtains an affirmative result, it shifts to the next Step SP42. In Step SP42, the control part 91 retrieves the motor driving amount information from the memory part 92, and adds the motor driving amount of the mounting plate drive motor 71 at this time to the motor driving amount before the detachment shown by the motor driving amount information to calculate a new motor driving amount before the detachment, and after storing the motor driving amount information showing the calculated new motor driving amount before the detachment, it returns to Step SP1. In this way, between the time in which the medium cassette 21 is pulled out and is detached from the cassette install part 3C, every time the control part 91 operates the mounting plate drive motor 71 to elevate the medium mounting plate 22, it updates the motor driving amount information stored to the memory part 92 so as to sequentially accumulate the motor driving amount before detachment.

Further, in Step SP1, when the control part 91 detects from the cassette installation/detachment sensor 25 that the medium cassette 21 has been pulled out and detached from the cassette install part 3C and obtains a negative result, it cyclically and repeatedly executes the processes of the Step SP3 and Step SP4 after executing the process of the next Step SP2. Further, in Step SP4, when the first timer clocking time reaches the first setting time before the medium cassette 21 is installed in the cassette install part 3C, the control part 91 shifts to the next Step SP6. On the other hand, in Step SP3, when the control part 91 detects with the cassette installation/detachment sensor 25 that the medium cassette 21 is installed to the cassette install part 3C before the first timer clocking time reaches the first setting time, it executes the process of Step SP5 then shifts to the next Step SP43. In Step SP43, the control part 91 operates the mounting plate drive motor 71 to elevate the medium mounting plate 22 of the medium cassette 21 from the lower limit position in the elevation range to a position at which the uppermost medium 2 is pressed against the feeding roller 23, and after the motor driving amount of the mounting plate drive motor 71 at this time is detected as the motor driving amount at the time of installation, it shifts to the next Step SP44. In Step SP44, the control part 91 retrieves the motor driving amount information from the memory part 92 and compares the motor driving amount at the time of installation to the motor driving amount before detachment as shown by the motor driving amount information, and then it shifts to the next Step SP45. Therefore, in Step SP45, the control part 91 determines whether or not the difference in the driving amount is within the prescribed range. As a result, in Step SP45, when the control part 91 obtains an affirmative result since the difference in the driving amount is a value within the prescribed range, it shifts to the next Step SP46. Further, in Step SP46, without displaying the medium setting screen on the display part 68 and using the motor driving amount at the time of installation as the new motor driving amount before the detachment, the control part 91 stores the motor driving amount information showing the motor driving amount before the detachment to the memory part 92, and then it returns to Step SP1. Also, in Step SP45, when the control part 91 obtains a negative result since the difference in the driving amount is a value outside the prescribed range, it shifts to the next Step SP6.

In Step SP6, the control part 91 displays the medium setting screen on the display part 68 and then continues to cyclically and repeatedly execute the processes of Step SP7 and Step SP8. Then, in step SP7, when the medium setting information is arbitrarily inputted via the operation part 67 according to the content of the medium setting screen and the termination of the display of the medium setting screen is instructed and an affirmative result is obtained since, the control part 91 shifts to Step SP47 and after terminating the display of the medium setting screen on the display part 68 (that is, turning off the display of the medium setting screen), it shifts to the next Step SP48. In Step SP48, the control part 91 determines whether or not the medium mounting plate 22 of the medium cassette 21 is elevated from the lower limit position of the elevation range. At this time, in Step SP48, the control part 91 executes the process of Step SP6 after executing the process of Step SP4, and when continuing to execute the process of the Step SP7, since the medium cassette 21 is not yet installed in the cassette install part 3C, it obtains a negative result since the medium mounting plate 22 is not elevated, and it shifts to the next Step SP49. Then, in Step SP49, the control part 91 waits for the medium cassette 21 to be installed in the cassette install part 3C of the printer case 3, and when it detects with the cassette installation/detachment sensor 25 that the medium cassette 21 is installed in the cassette install part 3C, it shifts to the next Step SP50. With this, in Step SP50, the control part 91 elevates the medium mounting plate 22 of the medium cassette 21 from the lower limit position in the elevation range to a position at which the uppermost medium 2 is pressed against the feeding roller 23 to detect the motor driving amount at the time of installation, and then it shifts to the next Step SP51. Therefore, in Step SP51, after storing the motor driving amount information showing the motor driving amount before the detachment in which the motor driving amount at the time of installation is used as the new motor driving amount before detachment to the memory part 92, the control part 91 shifts to the next Step SP52 and terminates the third setting screen display control process procedure RT3. On the other hand, in Step SP48, the control part 91 executes the process of Step SP6 after executing the process of Step SP45, and when continuing to execute the process of the Step SP7, it obtains an affirmative result since the medium mounting plate 22 of the medium cassette 21 is already elevated from the lower limit position of the elevation range, and it shifts to Step SP51. Further, in Step SP51, using the motor driving amount at the time of installation of the mounting plate drive motor 71 that was already detected when the medium mounting plate 22 was elevated as the new motor driving amount before the detachment, after storing the motor driving amount information showing the motor driving amount before the detachment to the memory part 92, the control part 91 shifts to the next Step SP52 and terminates the third setting screen display control process procedure RT3.

Further, in Step SP8, when the control part 91 sequentially executes the processes of Step SP6 and Step SP7 after executing the process of Step SP45, it obtains an affirmative result since the medium cassette 21 is installed to the cassette install part 3C, and it shifts to the next Step SP53. Further, in Step SP53, although the control part 91 determines whether or not the medium mounting plate 22 of the medium cassette 21 is elevated from the lower limit position of the elevation range, it obtains an affirmative result since the medium mounting plate 22 is elevated from the lower limit position of the elevation range, and it shifts to Step SP54. Therefore, in Step SP54, using the motor driving amount at the time of installation of the mounting plate drive motor 71 that was already detected when the medium mounting plate 22 was elevated as the new motor driving amount before the detachment, after the control part 91 stores the motor driving amount information showing the motor driving amount before the detachment to the memory part 92, it shifts to the next Step SP11. On the other hand, in Step SP8, the control part 91 sequentially executes the processes of Step SP6 and Step SP7 after executing the process of Step SP4, so even when it detects with the cassette installation/detachment sensor 25 that the medium cassette 21 is installed to the cassette install part 3C and obtains an affirmative result, it shifts to the next Step SP53. However, in Step SP53, the control part 91 does not elevate the medium mounting plate 22 of the medium cassette 21 from the lower limit position of the elevation range and obtains a negative result, and it shifts to Step SP55. Therefore, in Step SP55, the control part 91 operates the mounting plate drive motor 71 to elevate the medium mounting plate 22 from the lower limit position in the elevation range to a position at which the uppermost medium 2 is pressed against the feeding roller 23 to detect the motor driving amount at the time of installation, then it shifts to Step SP54. In this way, in Step SP54, the control part 91 stores the motor driving amount information showing the motor driving amount at the time of installation as the new motor driving amount before the detachment to the memory part 92, and shifts to the next Step SP11. Then, after the control part 91 continues to arbitrarily execute the processes of Steps SP11 to SP14 and Step SP9, it shifts to Step SP52 and terminates the third setting screen display control process procedure RT3. It should be noted that, in a similar manner as the control part 65 of the aforementioned first embodiment, the control part 91 according to the third embodiment, for example, starts the third setting screen display control process procedure RT3 according to the start-up of the monochrome printer 90, but during the operation of the monochrome printer 90 (that is, during energization), after the third setting screen display control process procedure RT3 is terminated, the third setting screen display control process procedure RT3 is started again. In this way, during the operation of the monochrome printer 90, the control part 91 repeatedly executes the third setting screen display control process procedure RT3, and every time the medium cassette 21 is pulled out from the cassette install part 3C, it arbitrarily displays the medium setting screen on the display part 68 and allows the medium setting information to be inputted.

(3-4) Operation and Effect of Embodiment 3

In the aforementioned structures, while the medium cassette 21 is installed in the cassette install part 3C of the printer case 3, every time the control part 91 of the monochrome printer 90 operates the mounting plate drive motor 71 to elevate the medium mounting plate 22, it sequentially adds the motor driving amount at that time and stores it to the memory part 92 as the motor driving amount before the detachment. In addition, when the control part 91 of the monochrome printer 90 detects with the cassette installation/detachment sensor 25 that the medium cassette 21 is pulled out from the cassette install part 3C and detached from the cassette install part 3C of the printer case 3 again, it starts the clocking with the first timer. Then, when the control part 91 of the monochrome printer 90 detects with the cassette installation/detachment sensor 25 that the medium cassette 21 is installed in the cassette install part 3C before the first timer clocking time reaches the first setting time, it operates the mounting plate drive motor 71 to elevate the medium mounting plate 22 of the medium cassette 21 from the lower limit position in the elevation range to a position in which the uppermost medium 2 is pressed against the feeding roller 23, and it compares the motor driving amount at the time of installation of the mounting plate drive motor 71 at this time to the motor driving amount before the detachment stored in the memory part 86. As a result, when the difference of the driving amount of the motor driving amount at the time of installation and the motor driving amount before the detachment is within the prescribed range, the control part 91 of the monochrome printer 90 does not display the medium setting screen on the display part 68. According to the aforementioned structure, in a case where the medium cassette 21 is pulled out by the user once from the cassette install part 3C of the printer case 3 to check the type, the loading amount, the loading orientation, etc., of the medium 2 loaded in the medium cassette 21 and installed again so as to be pushed in, by comparing the motor driving amount at the time of the installation of the mounting plate drive motor 71 and the motor driving amount before the detachment, the monochrome printer 90*t* more accurately confirms that the installation/detachment of the medium cassette 21 from the cassette install part 3C was to check the medium 2 and can thereby avoid displaying the medium setting screen on the display part 68. With this, in a case where the medium cassette 21 is installed/detached from the cassette install part 3C to check the medium 2, the monochrome printer 90 can more assuredly free a user from the trouble of having to operate the operation part 67 to terminate the display of the medium setting screen, or waiting until the display is automatically terminated, thereby improving the usability.

In addition, when the medium cassette 21 is installed in the cassette install part 3C before the first timer clocking time reaches the first setting time and when the motor driving amount at the time of installation and the motor driving amount before the detachment were compared and the difference of the driving amounts is not within the prescribed range, the monochrome printer 90 of the control part 91 displayed the medium setting screen on the display part 68. With this, in a case where the medium cassette 21 is pulled out from the cassette install part 3C of the printer case 3 and, for example, in such a case in which the type or the loading orientation of the medium 2 to be loaded is quickly changed, the monochrome printer 90 can automatically display the medium setting screen to guide the input of the medium setting information without performing an operation to display the medium setting screen on the display part 68, thereby further improving the usability.

(4) Other Embodiments (4-1) Other Embodiment 1

Figure 17:
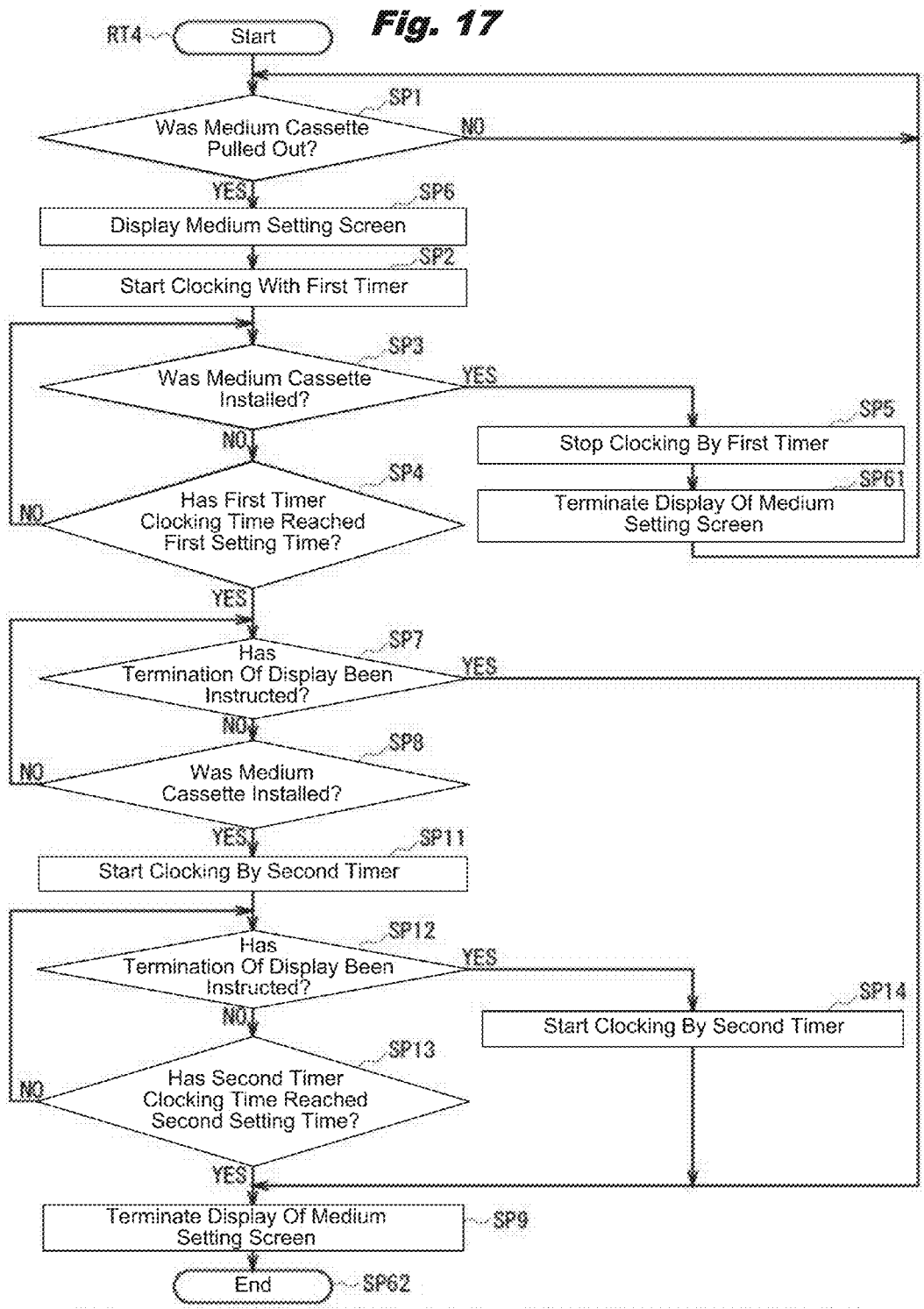
FIG. 17 is a flowchart showing a fourth setting screen display control process procedure according to another embodiment.

Further, the aforementioned first embodiment describes cases in which, when the control part 65 detects from the as installation/detachment sensor 25 that the medium cassette 21 is pulled out and detached from the cassette install part 3C and detects from the cassette installation/detachment sensor 25 that the medium cassette 21 is installed in the cassette install part 3C before the first timer clocking time reaches the first setting time, it does not display the medium setting screen on the display part 68. However, the present invention is not limited to that, and for example, as shown in FIG. 17 using the same symbols for the parts corresponding to FIG. 5, the control part 65 starts the fourth setting screen display control process procedure RT4, and detects with the cassette installation/detachment sensor 25 in Step SP1 that the medium cassette 21 is pulled out and detached from the cassette install part 3C, it shifts to the next Step SP6 to display the medium setting screen on the display part 68, and then after continuing to execute the process of Step SP2, it cyclically and repeatedly executes the processes of Step SP3 and Step SP4. Further, in the present invention, in Step SP3, when the control part 65 detects with the cassette installation/detachment sensor 25 that the medium cassette 21 is installed to the cassette install part 3C before the first timer clocking time reaches the first setting time, after it executes the process of the next Step SP5, it shifts to the next Step SP61 to terminate the display of the medium setting screen on the display part 68 and returns to Step SP1. In addition, in the present invention, when the control part 65 sequentially executes the processes of Steps SP1 to SP9, it shifts to Step SP62 and terminates the fourth setting screen display control process procedure RT4. In this manner, in the present invention, the medium setting screen can be displayed on the display part 68 caused by the medium cassette 21 being pulled out from the cassette install part 3C, and the display of the medium setting screen can be terminated caused by the medium cassette 21 being installed in the cassette install part 3C before the first timer clocking time reaches the first setting time. Further, in the present invention, the process of the fourth setting screen display control process procedure RT4 is applied to the second and third setting screen display control process procedure RT2 and RT3 according to the aforementioned second and third embodiments, and the medium setting screen can be displayed on the display part 68 caused by the medium cassette 21 being pulled out from the cassette install part 3C, the display of the medium setting screen on the display part 68 can be terminated when it is detected that the medium cassette 21 is installed in the cassette install part 3C before the first timer clocking time reaches the first setting time and that the type and the loading orientation of the medium 2 loaded in the medium cassettes 21 and 81 have not been changed, and the display of the medium setting screen on the display part 68 can be continued when it is detected that the type and the loading orientation of the medium 2 loaded in the medium cassettes 21 and 81 have been changed. In the present invention, with related structures, when the medium cassettes 21 and 81 are installed/detached from the cassette install part 3C to check the medium 2, the trouble of operating the operation part 67 to terminate the display of the medium setting screen or waiting for the display to be automatically terminated can be assuredly relieved to improve the usability of the monochrome printers 1, 80 and 90.

In addition, in the present invention, for example, in Embodiment 1, the medium cassette 21 is provided with a medium size detecting sensor for detecting the loaded orientation and the size of the medium 2 loaded in the medium cassette 21 as the medium size based on the guide arrangement positions of the rear guide 32 and a pair of side guides 33 and 34. Further, in the present invention, when the medium cassette 21 is installed in the cassette install part 3C, the control part 65 detects the medium size with the medium size detection sensor and stores it to the memory part 69 as the medium size information. Furthermore, in the present invention, when the control part 65 detects with the cassette installation/detachment sensor 25 that the medium cassette 21 was installed to the cassette install part 3C before the first timer clocking time reaches the first setting time, it continues to detect the medium size with the medium size detection sensor and compares it with the medium size shown by the medium size information retrieved from the memory part 69. As a result, in the present invention, when the control part 65 detects that the medium size has not changed before and after the installation/detachment of the medium cassette 21, it does not display the medium setting screen on the display part 68, and when it detects that the medium size has changed before and after the installation/detachment of the medium cassette 21, it can display the medium setting screen on the display part 68. Further, in the present invention, the related structure can be applied to the process of the fourth setting screen display control process procedure RT4, the medium setting screen can be displayed on the display part 68 caused by the medium cassette 21 being pulled out from the cassette install part 3C, the display of the medium setting screen on the display part 68 can be terminated when it is detected that the medium cassette 21 is installed in the cassette install part 3C before the first timer clocking time reaches the first setting time and also that the medium size has not changed from before and after the installation/detachment of the medium cassettes 21 and 81, and the display of the medium setting screen on the display part 68 can be continued when it is detected that the medium size has changed from before and after the installation/detachment of the medium cassettes 21 and 81. In addition, in the present invention, at least any two among the related structures and the structures of the second and the third embodiments may be combined to control the display of the medium setting screen at the time of installation/detachment of the medium cassettes 21 and 81. Furthermore, in the present invention, the fourth setting screen display control process procedure RT4 can be further applied to the combination of these structures to control the display of the medium setting screen at the time of installation/detachment of the medium cassettes 21 and 81. In the present invention, with the combination of these various structures, in a case where the medium cassettes 21 and 81 are installed/detached from the cassette install part 3C to check the medium 2, the trouble of operating the operation part 67 to terminate the display of the medium setting screen or waiting for the display to be automatically terminated can be assuredly relieved to improve the usability of the monochrome printers 1, 80 and 90.

(4-2) Other Embodiment 2

Further, in the aforementioned first to third embodiments, cases in which medium cassettes 21 and 81 to which any type of mediums 2 can be loaded by changing the loading orientation are detachably installed to the cassette install part 3C of the printer case 3, were described. However, the present invention is not limited to that, and a medium cassette to which any type of medium 2 can be loaded in the same loading orientation so as to be mounted in either a vertical direction or a horizontal direction to the medium mounting plate 22, can be detachably installed to the cassette install part 3C of the printer case 3. Furthermore, in the present invention, in the case of a related structure, for example, in the aforementioned second embodiment, there is no need for a user to select the loading orientation of the medium 2 to be loaded in the medium cassette 81 to be detected by the control part 85, so only the type of the medium 2 is chosen to be detected by the control part 85.

(4-3) Other Embodiment 3

Also, in the aforementioned first to third embodiments, a case in which the control parts 65, 85, and 91 of the monochrome printers 1, 80, and 90 execute the aforementioned first to third setting screen display control process procedures RT1 to RT3 with reference to FIG. 5, FIG. 11 and FIG. 12, and FIG. 15 and FIG. 16, according to the first to third setting screen display control process programs stored in the memory parts 69, 86, and 92 in advance, were described. However, the present invention is not limited to that, and the control parts 65, 85, and 91 of the monochrome printers 1, 80, and 90 can install the first to third setting screen display control process programs with a recording medium readable with a computer and in which the first to third setting screen display control process programs are stored, or it can install the first to third setting screen display control process programs from the outside using cable communications and wireless communications mediums such as a local area network, internet, digital satellite broadcast, etc. to execute the first to third setting screen display control process procedures RT1 to RT3. Further, a computer-readable recording medium for installing the first to third setting screen display control process programs to the monochrome printers 1, 80, and 90 to put them into an executable state, for example, can be materialized with a packaged media such as a flexible disc, CD-ROM (Compact Disc-Read Only Memory), DVD (Digital Versatile Disc), etc., or it can also be materialized with a semiconductor memory, magnetic disc, etc., to which the first to third setting screen display control process programs are temporarily or permanently stored. Further, as a means to store the first to third setting screen display control process programs to the recording medium readable with a computer, cable and wireless communications mediums such as a local area network, internet, digital satellite broadcast, etc., may be used. Furthermore, the first to third setting screen display control process programs can be stored in the computer-readable recording medium via various communication interfaces such as routers, modems, etc.

(4-4) Other Embodiment 4

Further, in the aforementioned first to third embodiments, a case in which the image forming apparatus of the present invention was applied to the aforementioned monochrome printers 1, 80 and 90 with reference to FIG. 1 to FIG. 17 was described.

However, the present invention is not limited to that, and can be widely applied to other image forming apparatuses having various structures such as a color electrographic printer having a direct transfer system or a secondary transfer system (hereinafter may be referred to as a color printer), a MFP (Multi-Function Peripheral), a facsimile, multifunction machine, a copy machine, etc.

(4-5) Other Embodiment 5

Furthermore, in the aforementioned first to third embodiments, as a medium cassette which is detachable from the case and to which a plurality of types of mediums can be selectively loaded, a case in which the aforementioned medium cassette 21 and 81 with reference to FIG. 1 to FIG. 17 is applied was described. However, the present invention is not limited to that, and other medium cassettes having various structures such as a medium cassette in which a medium mounting plate that diagonally raises only the feeding roller 23 side of the loaded medium 2, a medium cassette in which a plurality of types of mediums 2 are loaded to the medium mounting plate in the same loading orientation so as to be mounted in either the vertical direction or the horizontal direction, etc., can be widely applied.

(4-6) Other Embodiment 6

Further, in the aforementioned first to third embodiments, a case in which aforementioned cassette installation/detachment sensor 25 with reference to FIG. 1 to FIG. 17 was applied as a sensor for detecting the state of the medium cassette was described. However, the present invention is not limited to that, and other sensor having various structures such as a sensor for detecting a state in which the medium cassette 21 is completely pulled out form the cassette install part 3C, or a state in which the medium cassette 21 is pulled out from the cassette install part 3C while the rear edge part of the medium cassette 21 is left in the cassette install part 3C as a first state; and a state in which the medium cassette 21 is installed in the cassette install part 3C, or a state in which the medium cassette 21 is installed in the cassette install part 3C and connected electrically to the control part 85 and 91 as a second state; can be widely applied.

(4-7) Other Embodiment 7

Further, in the aforementioned first to third embodiments, a case in which the aforementioned medium setting information with reference to FIG. 1 to FIG. 17 was applied as the medium type information relating to the type of the medium loaded in the medium cassette was described. However, the present invention is not limited to that, and with the exception of information relating to the loading orientation of the medium 2 to the medium cassette 21 (that is, the mounting orientation of the medium 2 to the medium mounting plate 22 such as vertical direction or horizontal direction), other various medium type information can be widely applied, such as information only showing the type of the medium 2 loaded in the medium cassette 21 for forming print images (that is, size, material, thickness, etc.).

(4-8) Other Embodiment 8

Further, in the aforementioned first to third embodiments, a case in which the aforementioned medium setting screen data with reference to FIG. 1 to FIG. 17 was applied as the medium setting promotion information for setting the medium type information relating to the type of the medium loaded in the medium cassette. However, the present invention is not limited to that, and other medium setting promotion information having various structures can be widely applied, such as the medium setting requesting information for requesting to set medium type information to a host device such as an external host computer from the monochrome printers 1, 80, and 90.

(4-9) Other Embodiment 9

Further, in the aforementioned first to third embodiments, a case in which the aforementioned display part 68 with reference to FIG. 1 to FIG. 17 was applied as an output part for outputting the medium setting promotion information for setting the medium type information relating to the type of the medium loaded in the medium cassette was described. However, the present invention is not limited to that, and other output parts having various structures can be widely applied, such as the interface part 66 for communicating with the host device for requesting to set the medium type information to a host device such as an external host computer.

(4-10) Other Embodiment 10

Furthermore, in the aforementioned first to third embodiments, a case in which the control parts 65, 85, and 91 having the aforementioned microprocessor structures with reference to FIG. 1 to FIG. 17 were applied as the control part for performing the control of the image forming process using the medium loaded in the medium cassette based on the detection result of the sensor and the medium type information was described. However, the present invention is not limited to that, and other control parts having various structures such as a CPU (Central Processing Unit), a DSP (Digital Signal Processor), etc., can be widely applied.

(4-11) Other Embodiment 11

Further, in the aforementioned first to third embodiments, a case in which the aforementioned selection type operator 83 with reference to FIG. 1 to FIG. 17 was applied as the medium type detector provided in the medium cassette for detecting the type of the medium loaded in the medium cassette was described. However, the present invention is not limited to that, and other medium type detectors having various structures can be widely applied, such as a medium size detection sensor for detecting the medium size as the aforementioned medium type as described in the other Embodiment 1.

(4-12) Other Embodiment 12

Further, in the aforementioned first to third embodiments, a case in which aforementioned control part 91 for detecting the motor driving amount of the mounting plate drive motor 71 as the aforementioned loading amount of the medium 2 with reference to FIG. 1 to FIG. 17 was applied as the loading amount detecting part for detecting the loaded amount of the medium to the medium cassette was described. However, the present invention is not limited to that, and for example, other loading amount detecting parts having various structures can be widely used, such as a loading amount detecting part provided on the medium cassette 81 for optically or physically detecting the height from the upper surface of the medium mounting plate to the uppermost medium 2 as the loading amount of the medium 2.

The present invention can be used for an image forming apparatus such as a monochrome printer, a color printer, a MFP, a facsimile, a multifunction machine, a copier, etc.

What is claimed is:

1. An image forming apparatus, comprising:
   a case;
   a medium cassette that is detachably installed to the case and capable of selectively loading a plurality of types of mediums;
   a sensor that detects at least first and second states of the medium cassette, the first status being determined when the medium cassette installed in the case moves in a detaching direction and is detached from the case, and the second state being determined when the medium cassette moves in an installing direction, which is an opposite direction from the detaching direction, and is installed in the case after the first status is detected,
   an output part that outputs medium setting promotion information for setting medium type information relating to the type of the medium loaded in the medium cassette; and
   a control part that controls an image forming process using the medium loaded in the medium cassette based on a detection result by the sensor and the medium type information, wherein
   when the second state is detected by the sensor before a predetermined time passes from a detection of the first state by the sensor, the control part performs the image forming process by omitting an output of the medium setting promotion information, and
   when the second state is detected by the sensor after the predetermined time has passed from the detection of the first state by the sensor, the control part performs the image forming process after outputting the medium setting promotion information.

2. The image forming apparatus according to claim 1, further comprising
   a medium type detector that is provided with the medium cassette and detects the type of the medium loaded in the medium cassette, wherein
   in a case where the second state is detected by the sensor before the predetermined time passes from the detection of the first state by the sensor, the control part
      compares the types of the medium detected by the medium type detector, the types of the medium being determined before and after an installation/detachment of the medium cassette, and
      controls the output of the medium setting promotion information based on a result of the comparison.

3. The image forming apparatus according to claim 1, further comprising
   a medium type detector that is provided with the medium cassette and detects the type of the medium loaded in the medium cassette, wherein
   in a case where the second state is detected by the sensor before the predetermined time passes from the detection of the first state by the sensor, the control part
      compares two types of the medium that are detected by the medium type detector, one type being detected before the second state is detected, and the other type being detected after the second state is detected, and
      switches the output of the medium setting promotion information based on a result of the comparison.

4. The image forming apparatus according to claim 2, further comprising
   a selection operator that is provided with the medium cassette and selects a type of the medium loaded in the medium cassette, wherein
   the medium type detector detects the type of the medium selected via the selection operator.

5. The image forming apparatus according to claim 1, further comprising
   a loaded amount detecting part that detects a loaded amount of the medium to the medium cassette, wherein
   when the second state is detected by the sensor before the predetermined time passes from the detection of the first state by the sensor, the control part compares the loaded amounts of the medium detected by the loaded amount detecting part before and after an installation/detachment of the medium cassette, and controls the output of the medium setting promotion information based on a result of the comparison.

6. The image forming apparatus according to claim 5, comprising:

a medium mounting plate that is liftably provided on the medium cassette and mounts the medium thereon; and a motor that drives so as to lift the medium mounting plate, wherein the loaded amount detecting part detects motor driving amounts when the medium mounting plate is lifted by the motor at a timing before and after the installation/detachment of the medium cassette as the loaded amount of the medium to the medium cassette, and the control part compares the motor driving amounts detected by the loaded amount detecting part.

7. An image forming apparatus, comprising:

a case;

a medium cassette that is detachably installed to the case and capable of selectively loading a plurality of types of mediums;

a sensor that detects at least first and second states of the medium cassette, the first status being determined when the medium cassette installed in the case moves in a detaching direction and is detached from the case, and the second state being determined when the medium cassette moves in an installing direction, which is an opposite direction from the detaching direction, and is installed in the case after the first status is detected, an output part that outputs medium setting promotion information for setting medium type information relating to the type of the medium loaded in the medium cassette; and a control part that controls an image forming process, which is performed by an image forming unit, using the medium loaded in the medium cassette based on a detection result by the sensor and the medium type information, wherein when the second state is detected by the sensor before a predetermined time passes from a detection of the first state by the sensor, the control part causes the medium loaded in the medium cassette to be in a print-ready state without outputting the medium setting promotion information, the print-ready state being defined as the medium is positioned from at a top of the medium cassette to at a spot in front of the image forming unit, and when the second state is detected by the sensor after the predetermined time has passed from the detection of the first state by the sensor, the control part causes the medium to be in the print-ready state after outputting the medium setting promotion information.

8. A medium carrying apparatus, comprising:

a case;

a medium cassette that is detachably installed to the case and capable of selectively loading a plurality of types of mediums, each type of mediums being piled in the medium cassette;

a sensor that detects at least first and second states of the medium cassette, the first status being determined when the medium cassette installed in the case moves in a detaching direction and is detached from the case, and the second state being determined when the medium cassette moves in an installing direction, which is an opposite direction from the detaching direction, and is installed in the case after the first status is detected, an output part that outputs medium setting promotion information for setting medium type information relating to the type of the medium loaded in the medium cassette; and a control part that controls a medium carrying process in which the medium loaded in the medium cassette is carried toward a downstream of a carrying path, based on a detection result by the sensor and the medium type information, wherein when the second state is detected by the sensor before a predetermined time passes from a detection of the first state by the sensor, the control part causes the medium loaded in the medium cassette to be in a print-ready state without outputting the medium setting promotion information, the print-ready state being defined as the medium is positioned at a top of the medium cassette, and when the second state is detected by the sensor after the predetermined time has passed from the detection of the first state by the sensor, the control part causes the medium to be in the print-ready state after outputting the medium setting promotion information.

* * * * *